US008636061B2

(12) United States Patent
Mosse et al.

(10) Patent No.: US 8,636,061 B2
(45) Date of Patent: Jan. 28, 2014

(54) TOOL FOR DOWNHOLE FORMATION EVALUATION

(75) Inventors: Laurent Mosse, Montrouge (FR); Matthieu Simon, Princeton, NJ (US); Ollivier Faivre, Paris (FR); Mehdi Hizem, Paris (FR)

(73) Assignee: Schlumberger Technology Corporation, Sugar Land, TX (US)

( * ) Notice: Subject to any disclaimer, the term of this patent is extended or adjusted under 35 U.S.C. 154(b) by 594 days.

(21) Appl. No.: 12/668,224

(22) PCT Filed: Jun. 6, 2008

(86) PCT No.: PCT/EP2008/004677
§ 371 (c)(1),
(2), (4) Date: Aug. 23, 2010

(87) PCT Pub. No.: WO2009/006975
PCT Pub. Date: Jan. 15, 2009

(65) Prior Publication Data
US 2010/0307741 A1    Dec. 9, 2010

(30) Foreign Application Priority Data
Jul. 12, 2007  (EP) .................................... 07112397

(51) Int. Cl.
*G01V 3/30* (2006.01)
*E21B 47/00* (2012.01)
(52) U.S. Cl.
USPC ...................................... 166/250.01; 324/323
(58) Field of Classification Search
USPC ............... 166/250.01, 66; 324/338, 341, 343, 324/367; 367/25; 703/2
See application file for complete search history.

(56) References Cited

U.S. PATENT DOCUMENTS

| 3,849,721 | A | | 11/1974 | Calvert |
| 3,944,910 | A | | 3/1976 | Rau |
| 4,209,747 | A | | 6/1980 | Huchital |
| 4,511,842 | A | * | 4/1985 | Moran et al. ................... 324/338 |
| 5,345,179 | A | * | 9/1994 | Habashy et al. ............... 324/338 |
| 5,434,507 | A | * | 7/1995 | Beren et al. ................... 324/338 |
| 5,892,361 | A | * | 4/1999 | Meyer et al. ................... 324/338 |
| 7,284,605 | B2 | * | 10/2007 | Clark et al. ................. 166/254.2 |
| 2002/0047591 | A1 | | 4/2002 | Hirano et al. |

FOREIGN PATENT DOCUMENTS

| EP | 0869376 | 10/1998 |
| EP | 1 435 639 | 7/2004 |

(Continued)

OTHER PUBLICATIONS

European Office Action of the European Patent Application No. 05 11 0284, mailed on Apr. 6, 2006.

*Primary Examiner* — Daniel P Stephenson
(74) *Attorney, Agent, or Firm* — Stephanie Chi; Jody DeStefanis

(57) ABSTRACT

An apparatus for determining a property of a downhole formation, the apparatus comprising: an array having a plurality of transmitters and receivers capable of propagating electromagnetic waves through the formation; measuring circuitry for measuring an effect of the formation on the propagating waves; control circuitry arranged to vary the propagating waves as a function of at least one of frequency, spacing and polarization; and processing circuitry arranged to combine the effects of the propagating waves that are varied according to frequency, spacing and polarization for determining the property of the downhole formation.

9 Claims, 28 Drawing Sheets

(56) References Cited

FOREIGN PATENT DOCUMENTS

| | | |
|---|---|---|
| EP | 1693685 | 8/2006 |
| JP | 11-096921 | 4/1999 |
| JP | 2002-203487 | 7/2002 |
| JP | 2002-324488 | 11/2002 |
| KR | 1999-0056758 | 7/1999 |
| KR | 10-2002-0026040 | 4/2002 |
| KR | 10-2004-0058566 | 7/2004 |
| KR | 10-2004-0062381 | 7/2004 |

* cited by examiner

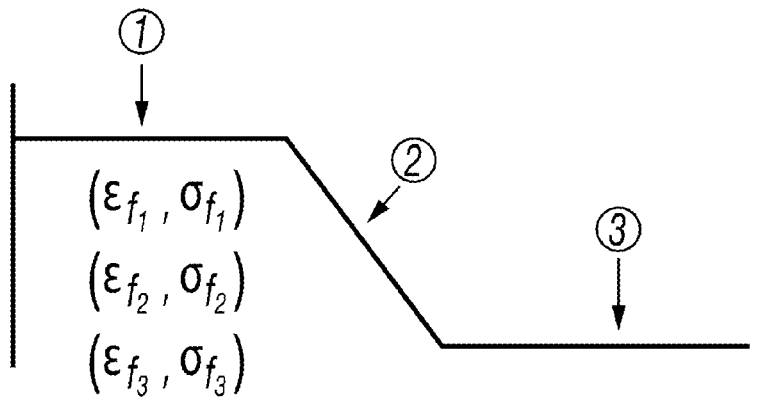
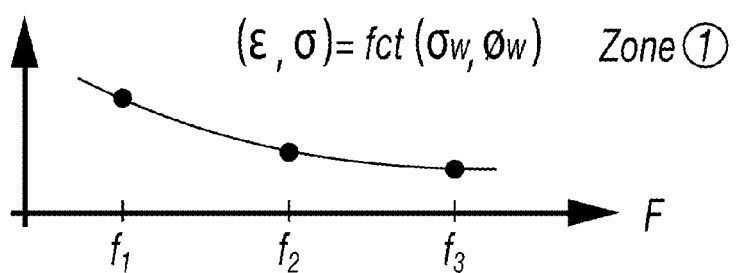
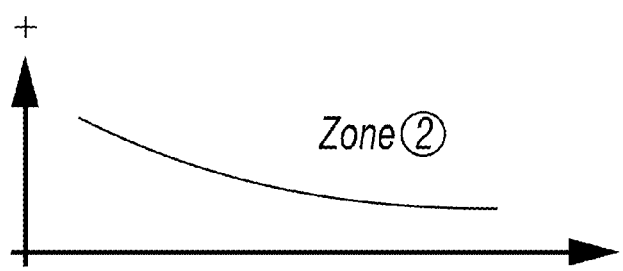
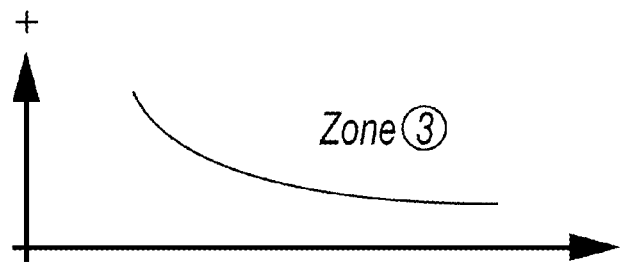
FIG. 17

TOOL FOR DOWNHOLE FORMATION EVALUATION

FIELD OF THE INVENTION

The invention relates to an apparatus and method for determining a property of a downhole formation, and in particular but not exclusively, for determination rock and/or fluid properties of the formation.

BACKGROUND OF THE INVENTION

Logging devices which measure formation dielectric constant are known, for example from U.S. Pat. No. 3,849,721 and U.S. Pat. No. 3,944,910. The logging device includes a transmitter and spaced receivers mounted in a pad that is urged against a bore hole wall. An electromagnetic (EM) microwave is transmitted into the formations, and the wave which has propagated through the formations is received at the receiving antennas. The phase shift and attenuation of this wave propagating in the formations is determined from the receivers output signals. The dielectric constant and the conductivity of the formations can then be obtained from the phase shift and attenuation measurements. Two transmitters are generally used in a bore hole compensated array to minimize the effect of bore hole rugosity, tool tilt, and dissimilarities in the transmitters, receivers, and their electronic circuits.

These types of probes had limited accuracy, which was improved by the architectural arrangement described in European Patent Publication No EP 1 693 685 published on 23 Aug. 2006. This arrangement proposed the use of a different spacing, frequency or wave polarization for performing EM measurements of the downhole formation.

SUMMARY OF THE INVENTION

It is desirable to propose a tool capable of providing even more accurate downhole measurements.

According to a first aspect of the invention there is provided an apparatus for determining a property of a downhole formation, the apparatus comprising: an array having a plurality of transmitters and receivers capable of propagating electromagnetic waves through the formation; measuring circuitry for measuring an effect of the formation on the propagating waves; control circuitry arranged to vary the propagating waves as a function of at least one of frequency, spacing and polarization; and processing circuitry arranged to combine the effects of the propagating waves that are varied according to frequency, spacing and polarization for determining the property of the downhole formation.

By combing the different effects simultaneously, the logging tool of the present invention is able to have more information about the formation and is therefore advantageously able to provide a more accurate image of the formation being scanned to the geologist on the surface. Indeed by combining these three effects simultaneously, the logging tool offers a cumulative advantage in increasing the accuracy of different properties of the scanned formation.

Preferably, wherein the simultaneous combination of the measured effects of varied frequency, spacing and polarization enable a plurality of different volumes of the formation to be scanned simultaneously.

Preferably, wherein the effects of a plurality of varied frequencies, spacing and polarization are combined simultaneously.

Preferably, wherein the control circuitry having a frequency generator for varying the propagating waves (not shown).

Preferably, wherein the spacing is varied by at least one of selecting transmitters and receivers in the array that are spaced at varied distances relative to each other.

Preferably, wherein the array is capable of varying the polarization to be at least one transversal and longitudinal polarization.

According to a further aspect of the invention there is provided a method for determining different volumes of a formation simultaneously, the method comprising: propagating electromagnetic waves through the formation with an array having a plurality of transmitters and receivers; measuring an effect of the propagating waves on the formation; controlling the propagating waves to vary as a function of frequency, spacing and polarization, each of varied propagating waves having a different effect on the formation; and combining the measured effects of the varied propagating waves for determining different volumes of the formation simultaneously.

Preferably, wherein at least some of the different volumes of the formation overlap such that it is possible to combine said overlapping volumes for determining a more accurate estimation of a property of the formation in the overlapping volumes.

Preferably, wherein the different volumes of the formation are different depths of investigation into the formation.

According to a further aspect of the invention there is provided a method for determining a radial profile of a formation, the method comprising: scanning the formation with a logging tool located adjacent a borehole wall of the formation, the logging tool having a transceiver array for propagating and measuring electromagnetic effects on the formation; modeling the scanned formation as a series of layers, the layers being located at respective radial distances from the borehole wall and wherein each radial layer being of a predetermined radial length; and determining for each of the series of layers a respective value of a formation property using a petrophysical model such that the determined radial profile is comprised of said respective values of the formation property that is a petrophysical property.

Preferably, wherein each of the layers having a predetermined radial length that is thin enough so as to represent the radial profile as a continuous profile.

According to a further aspect of the invention there is provided a logging tool for determining a radial profile of a formation, the logging tool comprising: a transceiver array adjacent a borehole wall of the formation for scanning the formation by propagating and measuring electromagnetic effects on the formation; processing circuitry for modeling the scanned formation as a series of layers, the layers being located at respective radial distances from the borehole wall and wherein each radial layer being of a predetermined radial length, said processing circuitry determining for each of the series of layers, a respective value of a formation property using a petrophysical model such that the determined radial profile is comprised of said respective values of the formation property that is a petrophysical property.

According to a further aspect of the invention there is provided a method for measuring a property of a formation, the method comprising: positioning a logging tool adjacent a borehole wall with a transceiver array having transmitters and receivers for propagating and measuring electromagnetic effects in the formation; selecting at least one transmitter and one receiver to be coupled together forming a transceiver pair having a single spacing for propagating and measuring the effects of the formation directly; and measuring the property of the formation at a distance substantially near to the borehole wall with the single-spaced transceiver pair; and compensating for a gain of the single-spaced transceiver pair to determine the property of the formation.

According to a further aspect of the invention there is provided a logging tool for measuring a property of a formation, the logging tool comprising: a transceiver array located adjacent a borehole wall having transmitters and receivers for propagating and measuring electromagnetic effects in the formation; selection circuitry for selecting at least one transmitter and one receiver to be coupled together to form a transceiver pair having a single spacing for propagating and measuring the electromagnetic effects of the formation directly; measuring the property of the formation at a distance substantially near to the borehole wall with the single-spaced transceiver pair; and compensating for a gain of the single-spaced transceiver pair to determine the property of the formation.

According to a further aspect of the invention there is provided a logging tool for measuring a property of an anisotropic formation, the logging tool comprising: a transceiver array located adjacent a borehole wall having transmitters and receivers for propagating and measuring electromagnetic effects in the formation; selection circuitry for selecting at least one transmitter and one receiver to be coupled together to form a transceiver pair having a single spacing for propagating and measuring the electromagnetic effects of the formation directly; and measuring the property of the anisotropic formation with the single-spaced transceiver pair.

According to a further aspect of the invention there is provided a method for modeling a logging tool, the method comprising: generating a tabulated representation of a homogenous pad model, which models the logging tool as a cylindrical geometrical model surrounded by a homogeneous formation, the tabulated representation being a table storing predetermined parameters; generating an analytical representation of a homogenous plane model, which models the logging tool as an infinite geometrical plane surrounded by a homogenous formation; determining the difference between the tabulated pad model and the analytic plane model to obtain a set of correction values; and
inverting a set of measured electromagnetic characteristics of a formation corrected with said set of correction values and using the non homogeneous plane model Preferably, wherein the set of measured electromagnetic characteristics is an attenuation and phase shift measurement.

According to a further aspect of the invention there is provided a method for modeling a logging tool, the method comprising: measuring the electromagnetic characteristics of a formation using a transceiver pad of the logging tool; performing inversion processing of the measured electromagnetic characteristics based on a pad model that considers the logging tool to have a cylindrical cross-sectional shape, wherein the processing associated with the pad model is reduced by assuming that the formation around the pad model is homogenous; and representing the pad model as a table having a plurality of predetermined parameters of the formation.

According to a further aspect of the invention there is provided a logging tool for detecting a fracture in a formation, the logging tool comprising: a transmitter and a receiver spaced at a distance on a pad of the logging tool for propagating and measuring electromagnetic effects in the formation; monitoring a response of the logging tool as the pad is passed over a fracture in the formation, wherein the response remains constant while the fracture is located between the transmitter and receiver; and detecting the fracture from the constant response of the logging tool.

According to a further aspect of the invention there is provided an imaging system for displaying a property of a formation located downhole to a user, the system comprising: a logging tool located substantially adjacent the formation located downhole, the logging tool comprising a transceiver pad with associate control circuitry for controlling the propagation and measurement of electromagnetic effects on the formation; processing circuitry for performing at least one of the functions: modeling the formation to determine a petrophysical parameter of the formation directly from the measured electromagnetic effects, modeling the logging tool as a pad model with a predetermined parameter table for reducing processing complexity, using single-spaced transmitter-receiver pairs for determining a property close to the borehole wall and for an anisitropic formation, determining the location of a fracture and a dimension thereof, and the detection of conductive and non-conductive inclusions in the formation by combing a longitudinal and transverse polarizations; and a display unit for displaying the property of the formation based on a result of the at least one function performed by the processing circuitry.

LIST OF DRAWINGS

Embodiments of the present invention will now be described by way of an example with reference to the accompanying drawings, in which:

FIG. 17 shows the petrophysical model automatically linking the different frequencies;

DESCRIPTION

Figure 1:
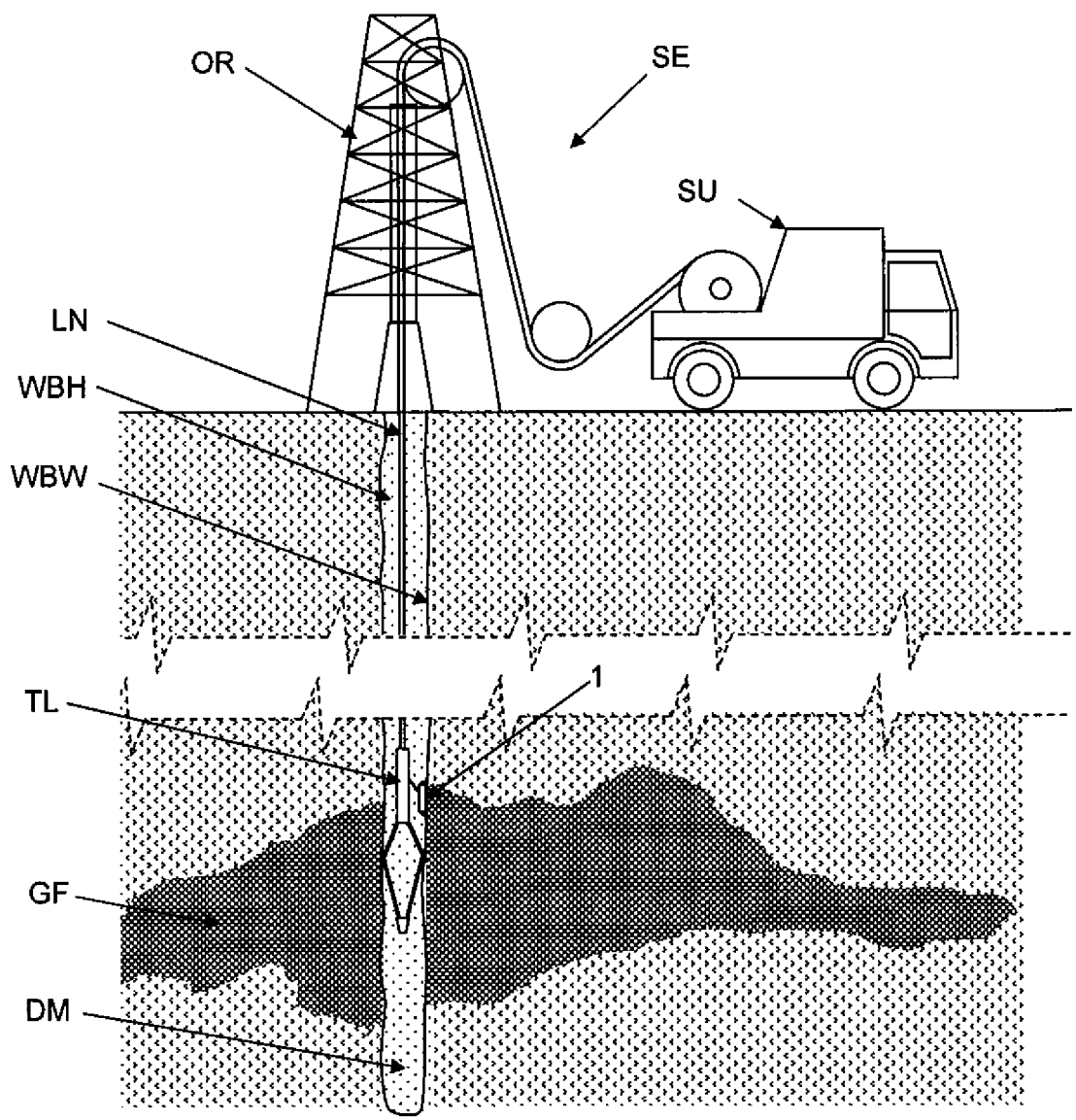
FIG. 1 shows a an example of a typical onshore hydrocarbon well location.

FIG. 1 schematically shows a typical onshore hydrocarbon well location and surface equipments SE above a hydrocarbon geological formation GF after drilling operation has been carried out. At this stage, i.e. before a casing string is run and before cementing operations are carried out, the well-bore is a bore hole WBH filled with a fluid mixture DM. The fluid mixture DM is typically a mixture of drilling fluid and drilling mud. In this example, the surface equipments SE comprises an oil rig OR and a surface unit SU for deploying a logging tool TL in the well-bore WB. The surface unit may be a vehicle coupled to the logging tool by a line LN. Further, the surface unit comprises an appropriate device for determining the depth position of the logging tool relatively to the surface level. The logging tool TL may comprise a centralizer. The centralizer comprises a plurality of mechanical arm that can be deployed radially for contacting the well-bore wall WBW. The mechanical arm insures a correct positioning of the logging tool along the central axis of the well-bore hole. The logging tool TL comprises various sensors and provides various measurement data related to the hydrocarbon geological formation GF and/or the fluid mixture DM. These measurement data are collected by the logging tool TL and transmitted to the surface unit SU. The surface unit SU comprises appropriate electronic and software arrangements for processing, analyzing and storing the measurement data provided by the logging tool TL.

It should be appreciated that in an alternative embodiment such processing circuitry is capable of being located downhole in or near the logging tool TL itself. Such processing circuitry being capable of handling all the processing functionality pertaining to the various measurements and models described herein.

Moreover, while FIG. 1 is shown for a wireline application, it should also be appreciated that the embodiments describe herein are equally applicable to a logging while drilling application. That is, there is no need for the logging tool to be limited to an application wherein it is attached to a separate wire or cable controlling its movements, it is possible for the different functionality of the logging tool to be incorporated into the actual drill pipe itself (for example on the drill collar). This advantageously allows the benefits of the improved imaging techniques described herein to be used during the initial drilling stage as well.

The logging tool TL comprises a probe 1 for measuring the electromagnetic properties of a subsurface formation according to the invention. Once the logging tool is positioned at a desired depth, the probe 1 can be deployed from the logging tool TL against the bore hole wall WBW by an appropriate deploying arrangement, for example an arm.

Figure 2:
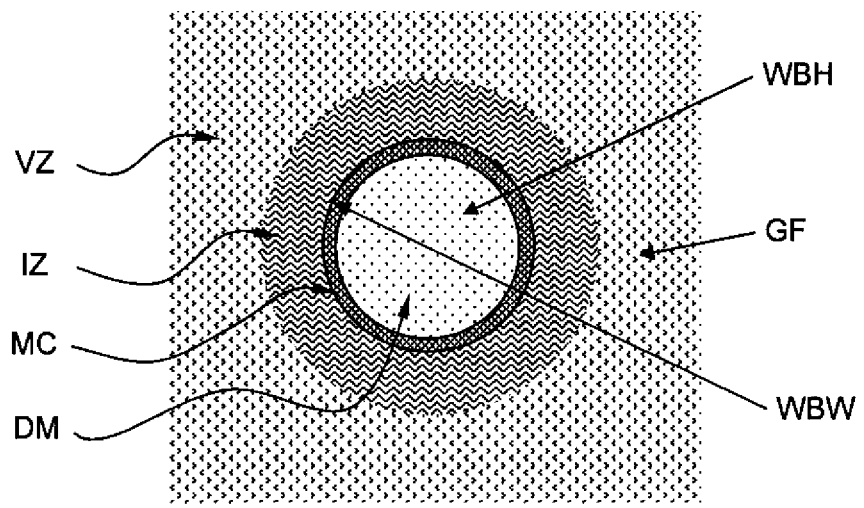
FIG. 2 shows a top cross-section view in a geological formation.

FIG. 2 is a top cross-section view in a geological formation GF. The bore hole WBH is filled with the fluid mixture DM, generally drilling fluid and drilling mud. The bore hole wall screens the particles of mud suspended into the fluid mixture. Thus, a shallow layer of mud, the so-called mudcake MC is generally formed on the bore hole wall WBW. A flushed or invaded zone IZ forming a first concentric volume surrounds the bore hole WBH. The fluid mixture DM generally filtrates through the mudcake MC and penetrates into the formation, forming the invaded zone IZ. The radial depth of the invaded zone varies from a few inch to a few feet. A true or virgin zone VZ surrounds the invaded zone IZ. It is only filled with the natural geological formation fluid. A further transition zone may be present between the invaded zone IZ and the virgin zone VZ.

Therefore, the measurement performed by the logging tool TL are affected by the presence of the fluid mixture DM into the geological formation GF, by the size of the invaded zone IZ and by the presence and size of the mudcake MC.

Figure 3:
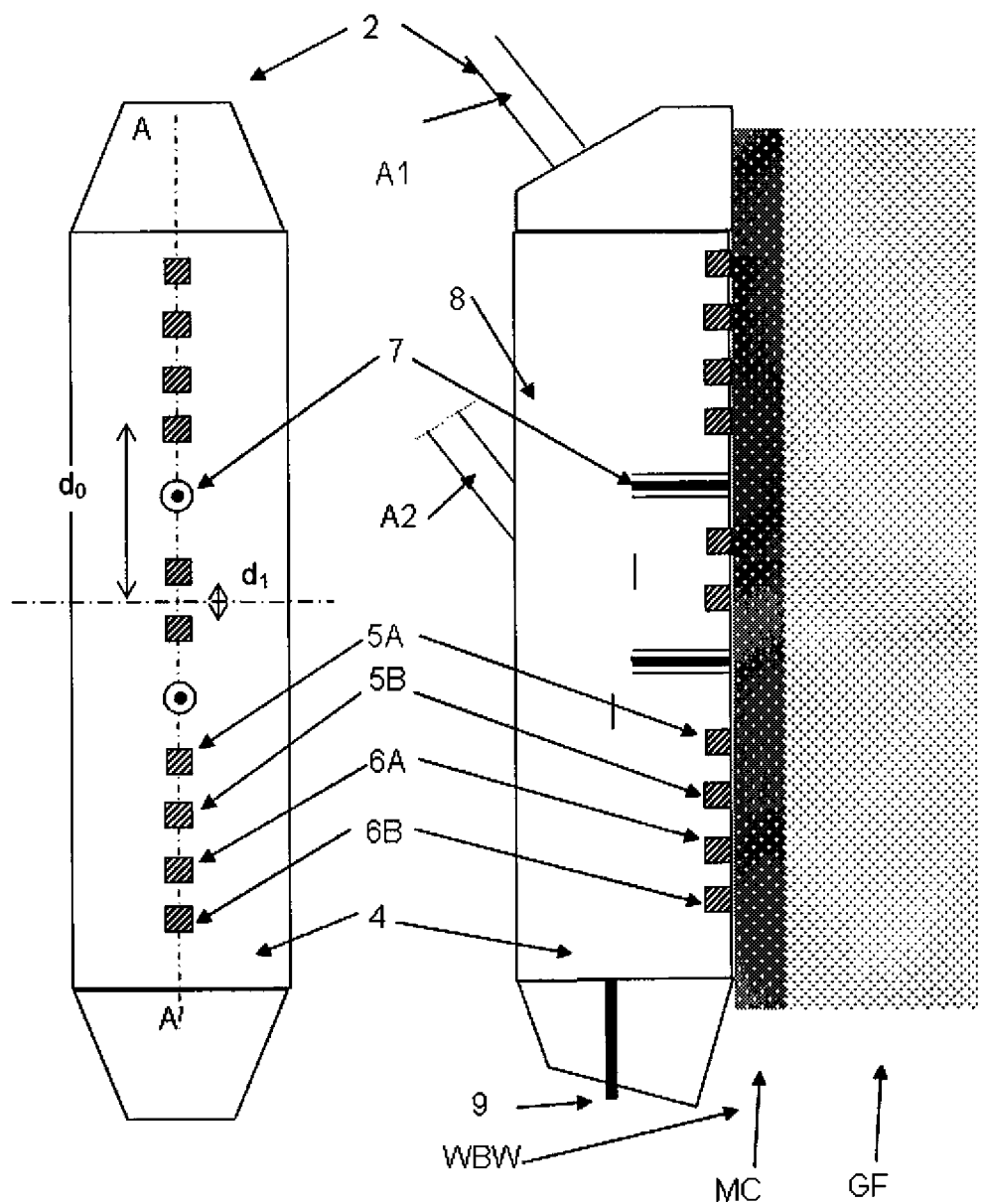
FIG. 3 shows two different profile views of the logging tool according to one embodiment.

FIG. 3 shows a two different profile views of the logging tool. The first profile is viewed as seen from the geological formation, while the other profile is viewed side-on to the formation showing the tool aligned adjacent to the MC. The logging tool is shown in the embodiment of FIG. 3 to comprise two transmitters and eight receivers distributed axially along a length of the logging tool. Specifically, there are four receivers located above the upper transmitter 7, another four receivers 5A, 5B, 6A and 6B located below the lower transmitter and two further receivers located between the upper 7 and lower transmitter. The electromagnetic probe 1 comprises a pad 2. The pad is a conductive metal housing, for example made in a metallic material like stainless steel. The pad 2 is coupled to the tool TL by an arm that enables the deployment of the electromagnetic probe 1, more precisely the pad 2, from the tool TL into the bore hole WBH.

It is possible to configure the two transmitting antennas to define a central point between them. Each antenna is spaced from a distance $d_0$ from the central point. The distance $d_0$ sensibly defines the electromagnetic probe depth of investigation, whereas the distance $d_1$ between the two transmitters sensibly defines the vertical resolution, for example 1 inch. The eight receiving antennas can be grouped into sets, for example 4 sets wherein each set comprising two receiving antennas positioned on each side of the transmitting antennas.

By varying the spacing of the sets of receiving antennas from the central point it is possible to vary the depth of investigation of the tool. That is, the respective sets of receiving antennas, being at different spacings (from the central points), are able to investigate at different radial depths into the formation.

Thus, the transmitter/receiver arrangement relies on electromagnetic wave propagation for measurements. The general principle of these measurements is to record at a receiver the voltage induced by a propagating electromagnetic field emitted at a transmitter.

Figure 4:
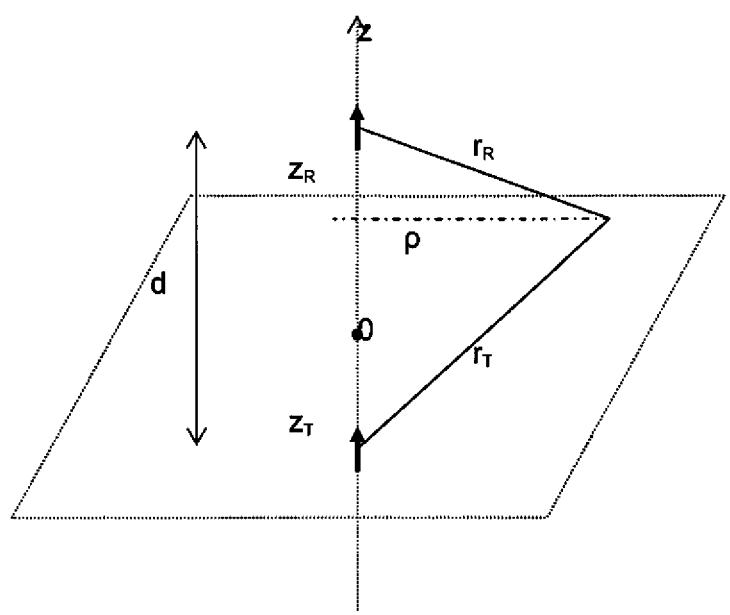
FIG. 4 shows a geometric representation of a transmitter and receiver defined in space.

FIG. 4 shows a basic diagram of the various parameters that may be defined and derived from such a transmitter-receiver relationship. The distance between the transmitter and receiver is d. The induced voltage at the receiver is proportional to the magnetic field at this receiver if the receiver is a magnetic dipole or proportional to the electric field if the receiver is an electric dipole. It is possible to extract from the complex induced voltage, its logarithmic amplitude and phase that can be expressed as:

$$\text{Amp} + i \cdot \text{Pha} \propto \ln(V) \propto \ln(H_R)$$

The characteristics of the electromagnetic field at the receiver on the dielectric properties of the surrounding medium can be described in terms of the relative permittivity $\in$ (unit-less) and the conductivity $\sigma$ in Siemens per meter [S/m]. Both properties can be described as a complex permittivity expressed:

$$\varepsilon^* = \varepsilon_r + i\frac{\sigma}{\omega\varepsilon_0},$$

where $\omega$ is the circular frequency of the electromagnetic wave. The medium propagation constant is linked to the complex permittivity through $$k = \frac{\omega}{c}\sqrt{\varepsilon^*}$$

If the medium in not homogeneous, for example if it contains radial layers, then the measured permittivity and conductivity of the different spacings, which are bulk quantities, are called apparent permittivity and apparent conductivity and are functions of the actual formation properties.

Therefore, various embodiments of the invention are able to take measurements using electromagnetic waves having different spacings, frequency and polarization for extracting more accurate radial information of the borehole characteristics. Specifically, the amplitudes and phases measurements are obtained from the logging tool having an array of transmitters and receivers with different spacings, polarizations and frequencies.

The so-called "forward model" FM is a model that relates the measured amplitude and phase to the actual properties of the formation:

$$\text{Amp} + i \cdot \text{Pha} = FM(\in_1, \in_2, h_1, \ldots), \quad \text{Equation 1}$$

where $\in_1, \in_2, h_1$, are constituent properties of the formation.

According to one embodiment of the invention, it is possible to simultaneously combine the data measured at different spacing, frequency and polarizations to inverse for formation radial profile. Specifically, each of the different spacing, frequency measurements has an associated radial response function and the benefit of combining these radial response functions allows for an improved characterization of various formation properties, for example the so-called 'standoff' and/or 'mudcake' values.

FIG. 4 shows that for a magnetic couple comprising a transmitter and receiver, in a longitudinal polarization, the sensitivity function relating the change in induced voltage due to a small permittivity perturbation at position ($\vec{r}$) reads $$\Gamma_\varepsilon^{V_{LG}}(\vec{r}, d) \propto G(\rho, z) \cdot \Delta(\rho, z)\Psi(\rho, z) \cdot \Phi(\rho, z), \quad \text{Equation 2}$$

with $$\Psi(\rho, z) = \exp\left(2i\pi \frac{r_T + r_R}{\lambda}\right)$$

$$\Delta(\rho, z) = \exp\left(-\frac{r_T + r_R}{\delta}\right)$$

$$G(\rho, z) = \left(\frac{\rho}{r_R \cdot r_T}\right)^3$$

$$\Phi(\rho, z) = \left(\frac{1 + \frac{r_T + r_R}{\delta} -}{\left(\frac{4\pi}{\lambda^2} - \frac{1}{\delta^2}\right) r_T r_R}\right) - i\frac{2\pi}{\lambda}\left(\frac{r_T + r_R +}{2\frac{r_T r_R}{\delta}}\right)$$

We call $G(\rho, z)$ the geometrical term, $\Delta(\rho, z)$ the skin depth term, $\Psi(\rho, z)$ the wave term and finally $\Phi(\rho, z)$ the gradient term.

The sensitivity function (Equation 2) is a function of various terms. The more these terms vary one from the other when different spacing, frequency and polarization measurements are compared; the higher the sensitivity and thus the more accurate is the determined radial profile of the formation.

FIGS. 5 to 10 show the respective contributions of the different terms that contribute to the sensitivity function.

Figure 5:
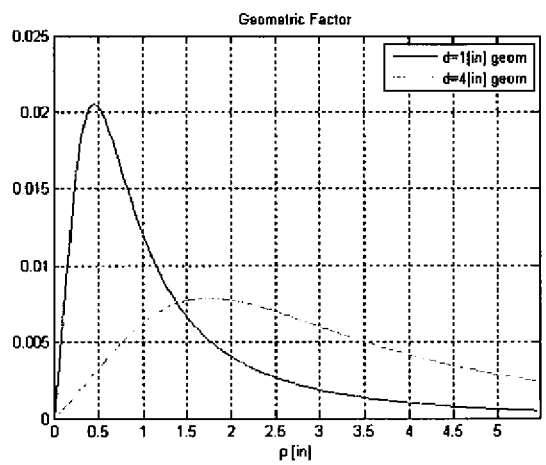
FIG. 5 shows a sensitivity response using different spacings.
Figure 6:
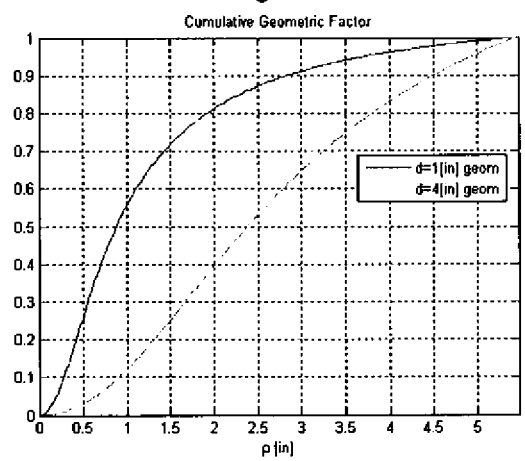
FIG. 6 shows the integrated response of FIG. 5.

Specifically, FIGS. 5 & 6 shows the responses of two different spacings. This is concerned with the geometric term of equation 1 above.

The first curve has a spacing of 0.03 m, while the second curve is the response for a spacing of 0.10 m. It can be seen that the second curve with the larger spacing has a peak sensitivity around 0.04 m, whereas the first curve is more sensitive at closer distances in which the response peaks at around 0.014 m.

FIG. 6 is the integrated sensitivity of FIG. 5, which in effect shows that by combining the responses of the different spacing measurements, it is possible for the tool to look at different volumes of the formation.

Thus the advantage of combining different spacings is that a wider range of sensitivity is offered by the tool, both nearer to the tool (i.e. borehall wall) as well as at distance further into the formation.

Figure 7:
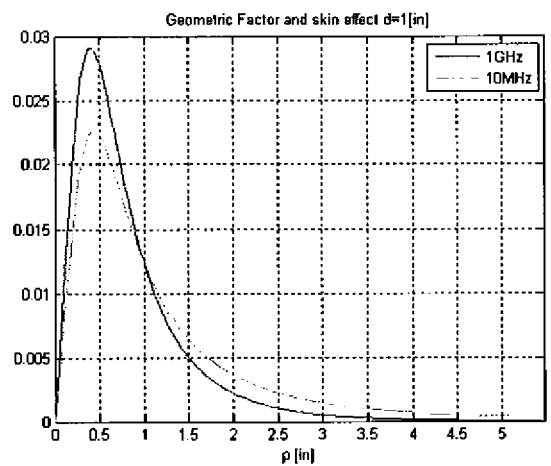
FIG. 7 shows the respective responses using different frequencies.
Figure 8:
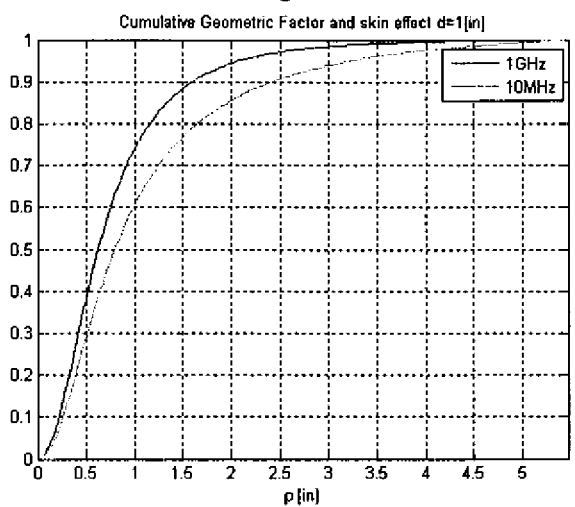
FIG. 8 shows the intergrated response of FIG. 7.

FIG. 7 shows the respective contributions of the logging tool using different frequencies for measuring the response. This is specifically concerned with the skin depth term of Equation 1. FIG. 8 is a normalized view of the response shown in FIG. 7, which again indicates the ability of the logging tool to be sensitive to slightly different volumes in the formation depending on the frequency used. The use of different frequencies allows the ability to probe (or scan) different depths of investigation of the formation and when combined advantageously offers an improved radial profile of the formation. Specifically, the 10 Mhz curve is able to see deeper into the formation, whereas the area between the two curves shows the extra volume seen by the logging tool as a result of the use of a different frequency.

Figure 9:
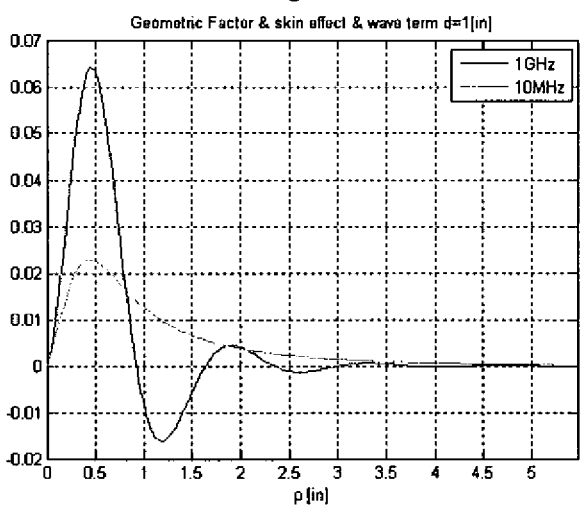
FIG. 9 shows a response combining the geometric factor, skin depth and wave effect terms using different frequencies.

FIG. 9 shows the combination of the geometric factor, skin depth and wave effect terms for two different frequencies.

Figure 10:
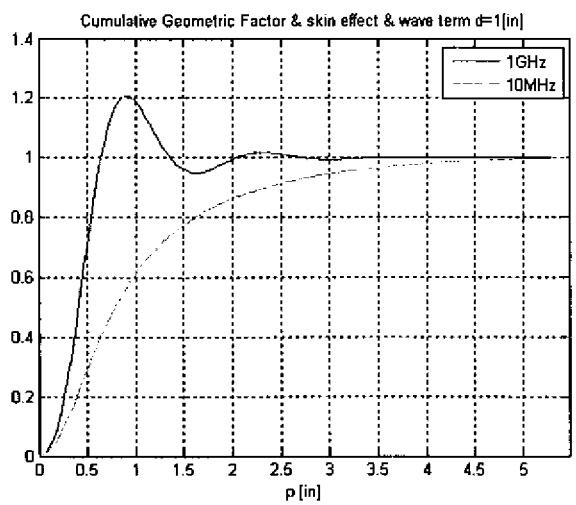
FIG. 10 shows the intergrated response of FIG. 9.

FIG. 10 is a normalized view of FIG. 9. FIGS. 9 and 10 show that at the higher frequency (1 GHz) the response is more oscillatory then at the lower frequency (10 MHz). This is important since the lower frequency simplifies the processing needed and allows an easier inversion calculation for determining the characteristics of the formation.

The logging tool also has the ability to focus the EM radiation wave in a longitudinal or transverse orientation with respect to the tool face with appropriate focusing means (not shown). That is, according to one embodiment, two collocated orthogonal strips are collocated in the antenna cavity of each transmitter and can be selectively energized by a power source for obtaining the different transverse and longitudinal polarizations.

Figure 11:
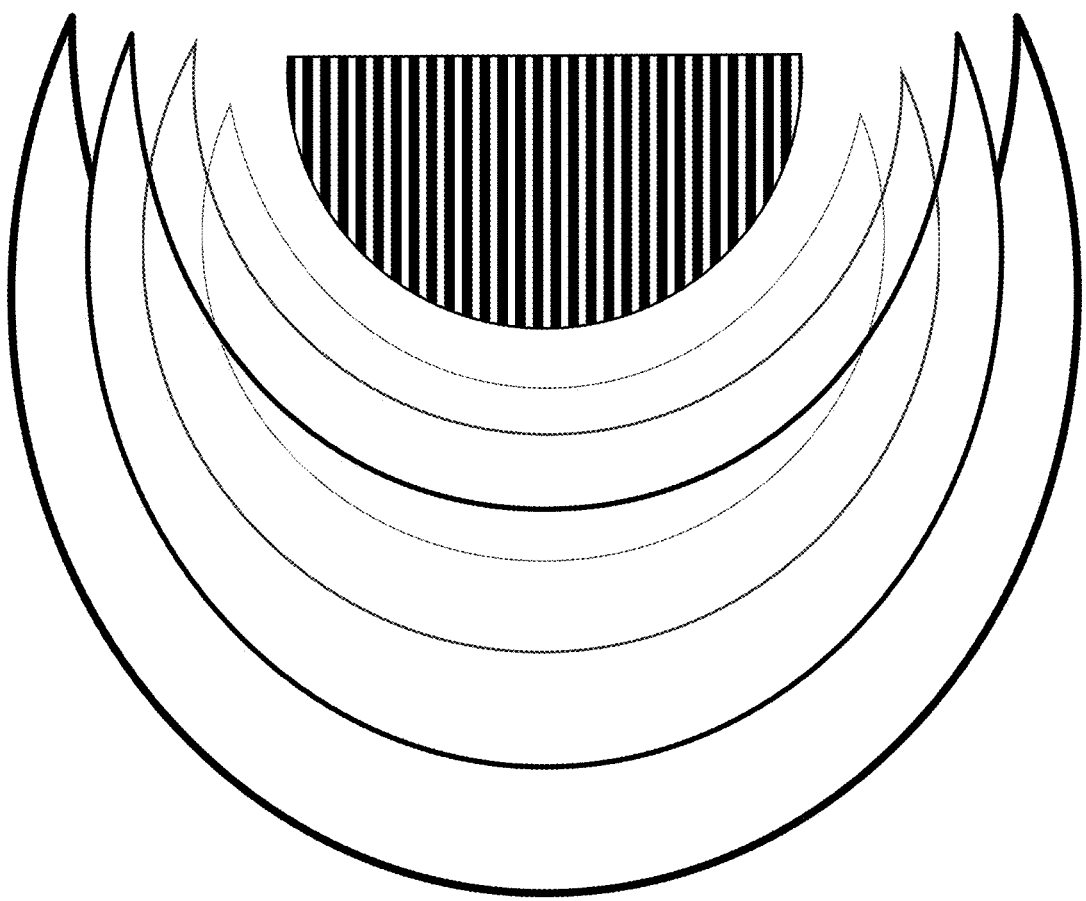
FIG. 11 shows a longitudinal polarization of the logging tool.
Figure 12:
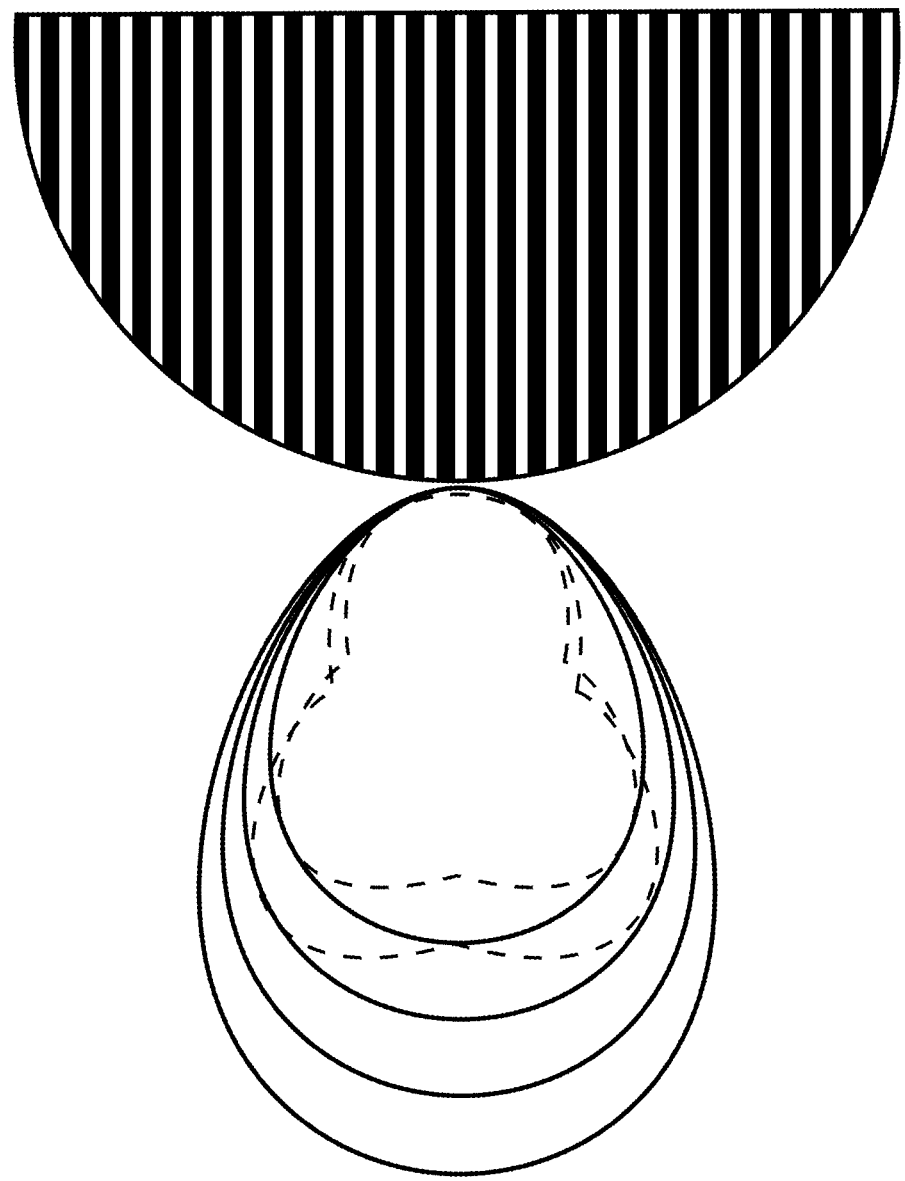
FIG. 12 shows a transverse polarization of the logging tool.

FIGS. 11 and 12 show top views of the respective polarizations where a portion of the borehole 110 (borehole wall not represented) is seen from above and the logging tool is assumed to be positioned adjacent the arc of the borehole wall. FIG. 11 shows a longitudinal polarization wherein the EM radiation pattern can be seen to scan a wider horizontal volume of the formation as compared to the transverse polarization of FIG. 12. FIG. 12 shows a transverse polarization in which the EM radiation pattern is focused more narrowly into the formation and shallower than the longitudinal polarization for further depth of investigation into the formation.

Thus, the logging tool is capable using the two different polarizations, longitudinal and transverse, in either a combined manner for a radial definition in the case of an isotropic (homogenous) formation, or to allow inversion for anisotropy in each layer in case of anisotropic formation.

Thus, it should be understood from equation 1 and FIGS. 5 to 12 that by varying the frequency, spacing and polarization of the logging tool, and more importantly by combining at least some of these measurements simultaneously, the logging tool offers great sensitivity over a broader range of measurement into the formation. By combining all three, i.e. using a plurality of different frequency, spacing and polarization measurements simultaneously, the optimal radial information of the formation can be obtained by the logging tool. However, in such a case, processing times might be longer in simultaneously combining the different measurements, but there is advantageously described the use of a lower frequency which might simplify such combined processing.

Figure 13:
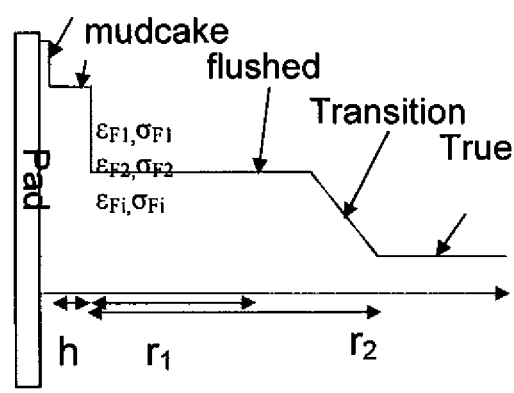
FIG. 13 shows an electromagnetic model of the formation according to one embodiment.
Figure 14:
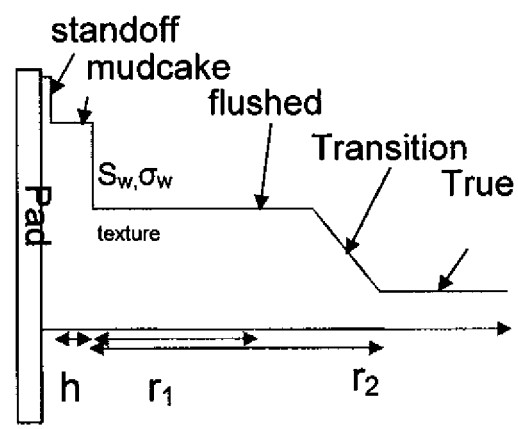
FIG. 14 shows a petrophysical model of the formation according to a further embodiment.

Furthermore, it possible to alleviating the processing requirements by selecting the underlying model to be used for processing the measurements in order to characterize the formation. A first model is the so-called 'electromagnetic model' (EM Model) as shown in FIG. 13, whereas the preferred model is the so-called 'petrophysical model' shown in FIG. 14. In brief, the advantage of the petrophysical model is that its outputs, the water conductivity $\sigma_w$ and water saturation $S_w$ are directly computed parameters of the formation that are required. Thus, unlike the EM Model no further processing iteration steps (i.e. inversions) are required to arrive at the desired parameters for characterizing the formation. A further difference is that for the EM model, the measurement frequencies used for each layer are independent, whereas for the petrophysical model the frequencies of the respective layers are linked.

More specifically, the EM model is a version of the standard FM model, which is used to model the tool response for a given set of permittivity $\in$ and conductivity $\sigma$ in each layer. In the EM model the measurement frequencies used are independent and not linked, whereas the geometric parameters are common FIG. 13 shows the EM model having different layers of the radial profile, which for example are defined as: a mudcake layer at a distance h from the borehole wall (i.e. standoff), a flushed layer up to a distance r1 from the mudcake layer, a true layer starting at a distance r2 from the mudcake layer and a transition layer between the flushed and true layers. For each of these layers it is possible to determine the tool response in term of attenuation and phase shift using the general equation:

$$\text{Amp} + i \cdot \text{Pha} = FM(h, r1, r2, \in_{standoff}^{Fi}, \sigma_{standoff}, \in_{mudcake}^{Fi}, \in_{flushed}^{Fi}, \sigma_{flushed} \ldots)$$ Equation 3

An example of such a model is the plane mudcake model where the pad is considered as an infinite plane. The magnetic field at receiver for longitudinally polarized transmitter and receiver reads $$H_{zz}(d, k_{mc}, k_{form}, h_{mc}) =$$

$$-i\frac{M_0}{4\pi}\int_{-\infty}^{\infty}dk_\rho k_\rho \begin{bmatrix} (1 - 2\tilde{R}^{TE}(k_{mc}, k_{form}, k_\rho)e^{2ik_{mc,z}h_{mc}})k_{mc,z}H_0^{(1)}(k_\rho d) - \\ (1 - 2\tilde{R}^{TE}(k_{mc}, k_{form}, k_\rho)e^{2ik_{mc,z}h_{mc}})k_{mc,z}\frac{H_1^{(1)}(k_\rho d)}{k_\rho d} + \\ (1 + 2\tilde{R}^{TM}(k_{mc}, k_{form}, k_\rho)e^{2ik_{mc,z}h_{mc}})\frac{k_{mc}^2}{k_{mc,z}}\frac{H_1^{(1)}(k_\rho d)}{k_\rho d} \end{bmatrix}$$

where $k_{mc}$, $k_{form}$ are the mudcake and formation propagation constants, $h_{mc}$ is the mudcake thickness and $k_{mc,z}=\sqrt{k_{mc}^2-k_\rho^2}$. $\tilde{R}^{TE}$ and $\tilde{R}^{TM}$ are TE and TM plane wave reflection coefficients.

The advantages of this model are:
Only geometrical assumptions
Inversion output are input for petrophysical model The following FIGS. 15 and 16 describe an example of processing using the EM model and its robustness to noise on the data.

In the example, the logging tool is capable of using all magnetic spacings in either differential or non-differential (single-spaced) modes, with all polarizations and at three different frequencies. The formation is isotropic. At each thickness step, the noise corresponds to the thermal background noise typical from the logging tool. In this example, the flushed zone is called shallow zone, there is no transition zone, and the true zone is called deep zone. The deep zone corresponds to a 10% water saturation 30 pu sandstone, with 5 ppkk water salinity. The shallow zone corresponds to 40% water saturation with 20 ppk filtrate salinity. Hence shallow zone permittivity and conductivity are higher than deep zone ones.

Figure 15:
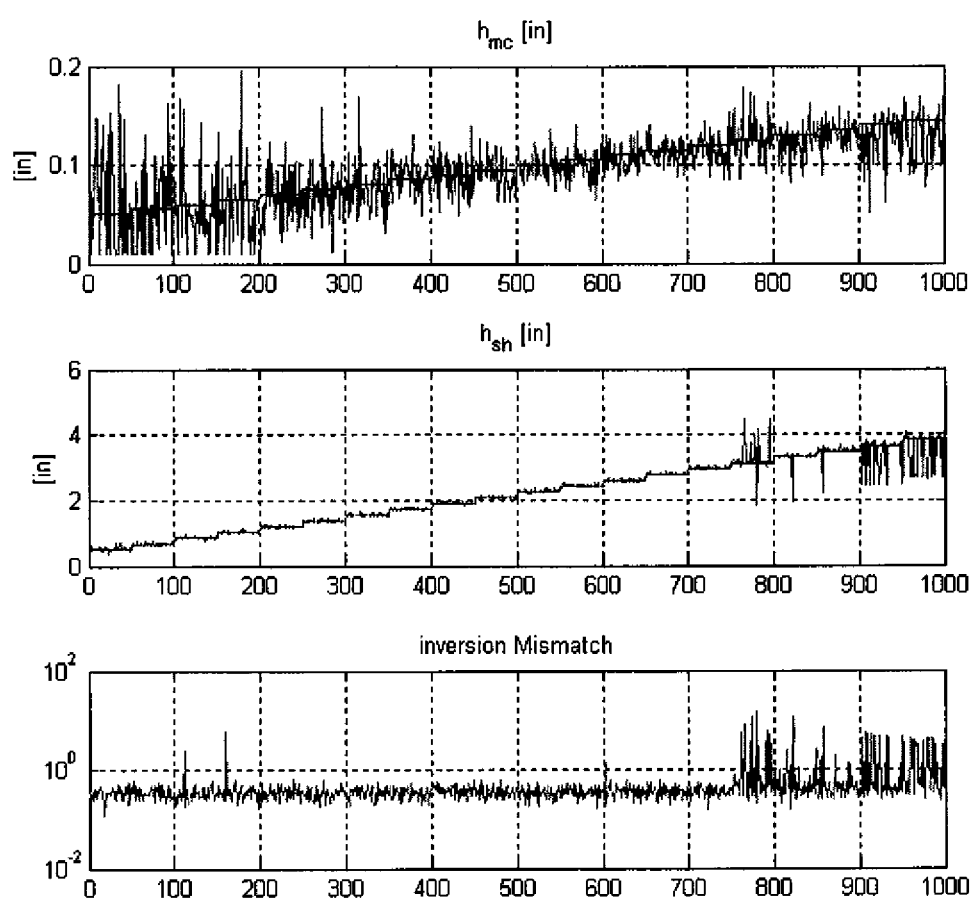
FIG. 15 shows an example of inversion results and inversion mismatch using the EM model.

FIG. 15 shoes the inversion results for geometrical parameters (hmc for mudcake, hsh for shallow zone, black are the true values, red the inverted ones) and inversion mismatch. The measurement response can be seen to be weakly sensitive to very small mudcake, lower than 0.07 inch.

Figure 16:
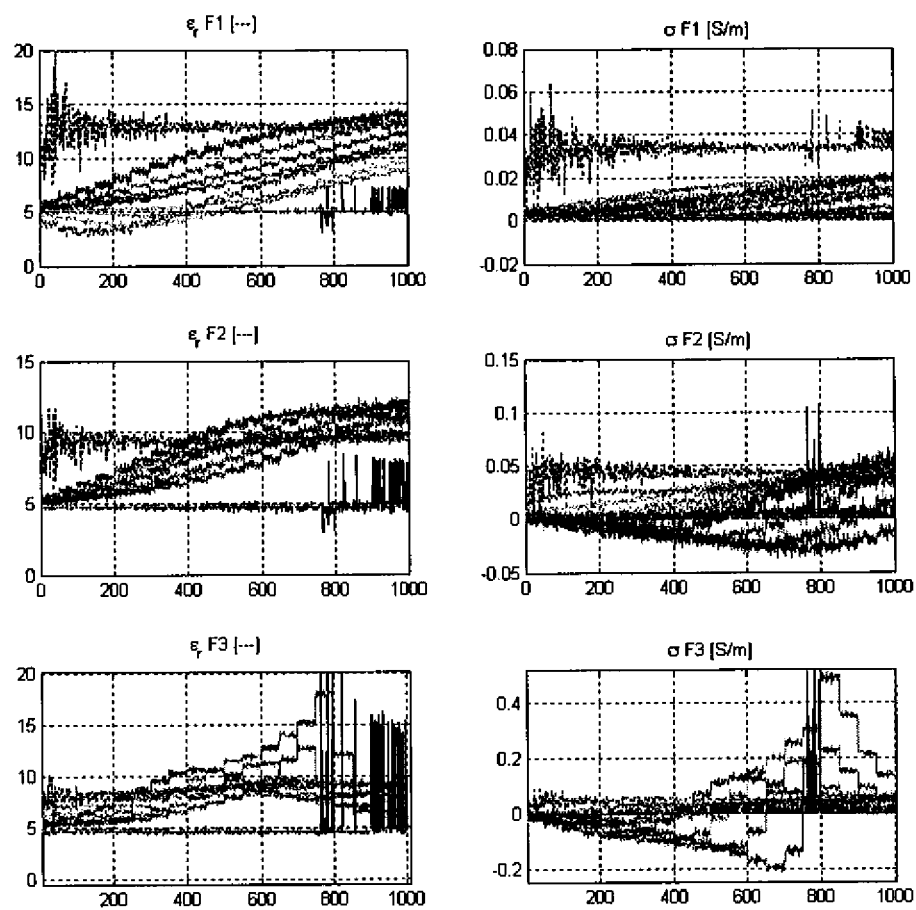
FIG. 16 shows an example of results sensitivies at various depths.

The mudcake thickness is not correctly reconstructed in the small mudcake zone, but the resulting deep zone properties are not affected as shown in FIG. 16.

Similarly on FIG. 16, the measurements are not highly sensitive to the shallow zone electromagnetic properties for small shallow zone thickness ($h_{sh}$). However the shallow zone thickness is reconstructed, as well as the deep zone EM properties. For shallow zone thickness larger than 3.5 inches, the measurements are no very sensitive to the deep zone. The reconstructed deep parameters and shallow zone thickness suffer from the noise.

This is enlightened by the mismatch value that passes the unit value, which is the limit of reconstruction below noise threshold. However, the a priori information that was entered in the present inversion was independent of the previous step. If we use the previous step information to initialize and set an a priori on the next value, we can improve the results. That is the choice to be made with real data, where formation properties should vary slowly with respect to the tool sampling rate. The mismatch value is an indication of closely the inverted results match those from the actual logging tool measurement, whereas the a priori value is what is used as an initial guess. An inversion is performed to select the optimized parameters, i.e. the model parameters that provide results that are closest to the actual logging tool data. More generally, the mismatch value is an indication of how coherent the measured data are as compared with the properties computed Note that the different spatial responses for different frequencies and spacing are clearly visible in EM model parameter inversion results. In black are the inversion results for shallow and deep zones that overlap the expected values in green (dashed for the shallow zone, solid for the deep zone). Apparent (single spacing measurement) color coding is blue for spacing 1, (nearest), cyan, magenta and red for spacing 4. Plain lines are for longitudinal 'apparents', while dashed lines are for transverse 'apparents'. The apparents are a single spacing that can be used to derive permittivity and conductivity assuming a homogeneous medium in front of the pad (no layering). Hence the shortened name 'apparent', since every spacing, polarization and frequency can be used to extract apparent permittivity and conductivity values. Thus, for a given frequency, if all apparent measurements overlap then the formation is fully homogeneous and no layering is present.

A petrophysical model links the different frequencies. FIG. 17 shows how the petrophysical model is able to combine the different frequencies for each layer/zone and to derive the water conductivity $\sigma_w$, the water saturation $S_w$ and eventually other formation parameters directly.

The model parameters are petrophysical parameters as water saturation and water conductivity in each layer. The model generically reads:

$$\text{Amp}+i\cdot\text{Pha}=\text{FM}(\sigma_{mud}, h_{standoff}, \phi_{mudcake}, h_{mudcake}, \phi_{rock}, S_{water,flushed}, h_{flushed}\ldots) \quad \text{Equation 4}$$

The geometrical underlying model is the same as for the EM model, but we add a petrophysical model that relates the electromagnetic properties of each layer to the petrophysical properties. An example of such a model is the CRIM, Complex Refractive Index Model that reads $$\in^*=((1-\phi_T)\sqrt{\in_{matrix}}+\phi_T(S_w\sqrt{\in_{water}^*}+(1-S_w)\sqrt{\in_{oil}}))^2,$$

where $\in^*$ is the electromagnetic properties for a layer that has a total porosity of $\phi_T$ and water saturation $S_w$. The matrix permittivity is $\in_{matrix}$ and the water permittivity that depends on the water conductivity $\sigma_w$ is $\in_{water}^*$.

The advantages of this model are:
Optimization of information
Possibility of petrophysical radial profiles (salt annulus)

Figure 18:
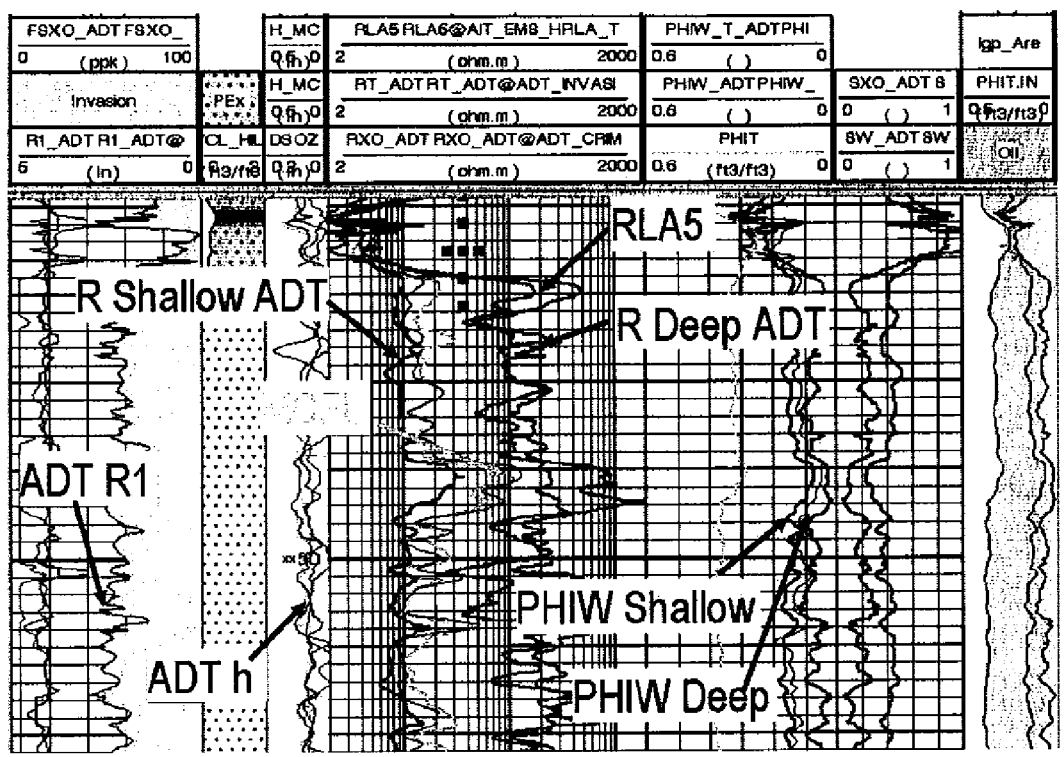
FIG. 18 shows an example of the results from processing using a petrophysical model on a field log when using r1=r2.

FIG. 18 shows the results from processing using a petrophysical model on a field log when using r1=r2 (step response). FIG. 18 shows the solving of the formation properties: hmc, r1, $\sigma_w$sh, $S_w$sh, $\sigma_w$deep, $S_w$deep (on the header SXO_ADT: shallow and SW_ADT: deep). Using Archies equation on the shallow and deep zone one can compute the deep resistivity and the shallow resistivity. These are then compared to other tools that actually measure these properties directly (RLA5 for deep resistivity and MCFL for shallow resistivity). Specifically, it is the moveable hydrocarbon shaded in the yellow column of FIG. 18 that displays these properties to the user (or geologist).

It should be appreciated that each of the layers of the model can be setup according to predetermined depths into the formation. By setting these predetermined depths to be relatively small, a greater number of 'thin' layers are used in the model. Eventually the layers can become thin enough to be substantially equivalent to modeling a continuous radial profile.

In a further embodiment it is advantageously possible for the logging tool to provide better resolution of the very shallow zone (for example, the stand-off and/or mudcake layers), which is based on a single transmitter to a single receiver measurement, i.e. an absolute measurement based on a single-spaced transmitter-receiver pair.

Figure 19:
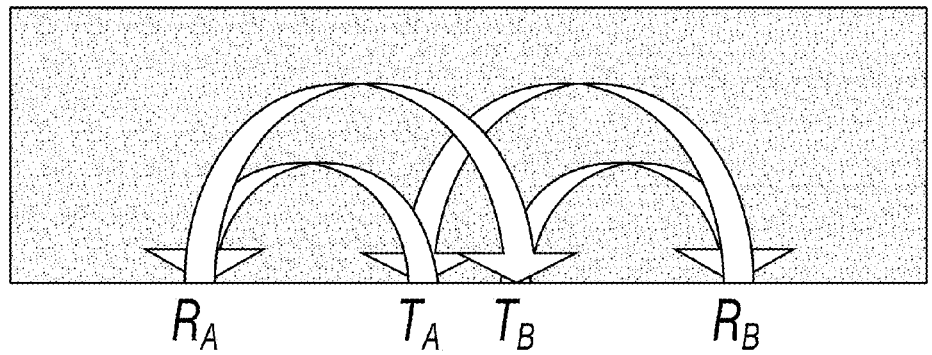
FIG. 19 shows standard differential measurement.

FIG. 19 shows a standard differential measurement performed by the logging tool, in which four measurements are combined, but they correspond to only two different transmitter-receiver spacings. Thus, the standard differential measurement of FIG. 19 relies on each receiver measuring the difference from different transmitters and then averaging the result, thereby compensating for the gain. In contrast, the non-differential measurements of FIGS. 20 and 21 rely on single-spaced absolute measurements in which the gains need to be compensated for. The advantage of the non-differential measurements is that they provide improved measurement sensitivity for shallower depths of investigation into the formation (i.e. mudcake).

Figure 20:
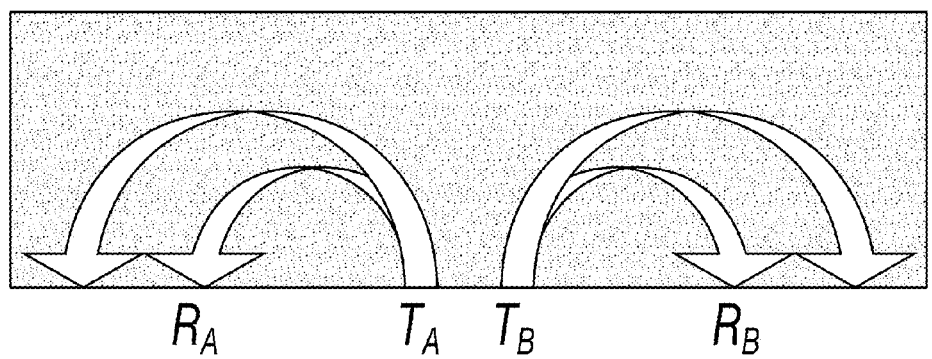
FIG. 20 shows a non-differential measurement according to a first embodiment.
Figure 21:
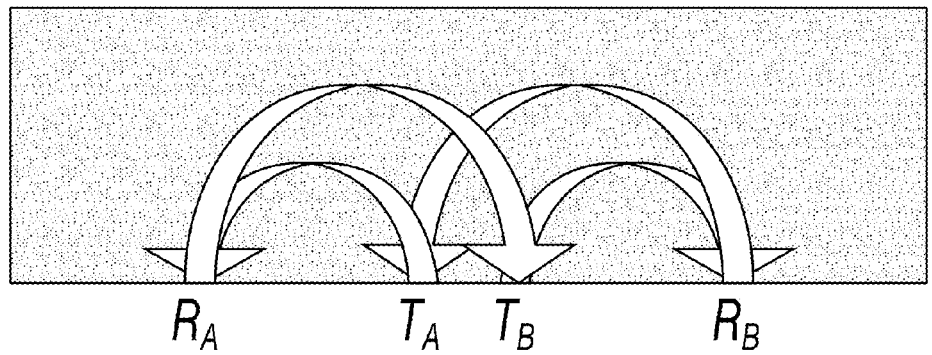
FIG. 21 shows two non-differential measurements according a further embodiment.

More specifically, FIG. 20 shows a non-differential measurement (also called single-spacing) being performed in which any single spacing transmitter-receiver pair can be used. In the example of FIG. 20, there are two single-spacing transmit-receiver pairs used. The first single-spacing pair comprises transmitter $T_A$ and receiver $R_A$, while the second single-spacing pair comprises transmitter $T_B$ and receiver $R_B$. It should be appreciated that any pair, of the array of transmitters and receivers mounted on the pad of the logging tool 2 as shown in FIG. 3, can be selected for defining a single-spacing measurement. There are two special cases:

i) When the single-spacing method of FIG. 20 for each receiver, in which case it is necessary to know the gain of each transmitter-receiver pair. In this case, the vertical resolution of the single-spacing measurements depend on each spacing, and ii) When the single-spacing method of FIG. 20 is used for the nearest spacing and to iteratively add the differential gain-free measurement to obtain single spacing measurements. This case only requires the knowledge of the nearest transmitter-receiver gain. The vertical resolutions of the corresponding single spacing measurements are roughly that of the nearest single spacing measurement, because the differential measurements are centered as shown in the example of FIG. 21. Specifically FIG. 21 shows a further embodiment which uses two single-spacing measurements using differential measurement minus single-spacing nearest measurement.

Thus, while the non-differential measurement offer improved resolution of the radial profile at shallower depths of investigation in the formation, there is the issue of the coupled gain of the single-spaced transmitter-receiver pair that needs to be taken into account. This can be determined by either calibrating during manufacturing, which depends on the temperate calibrated for the tool, or for each log, sections of known formation properties are selected. In the latter case, these sections can use the differential gain-free measurements to calculate the expected single spacing measurement values. The transmitter-receiver gains are then evaluated by comparing the expected values from out models, and the measured values. These measurements are made over several consecutive depth samples, and the effective gains are then fitted from the sample gains distributions.

Figure 22:
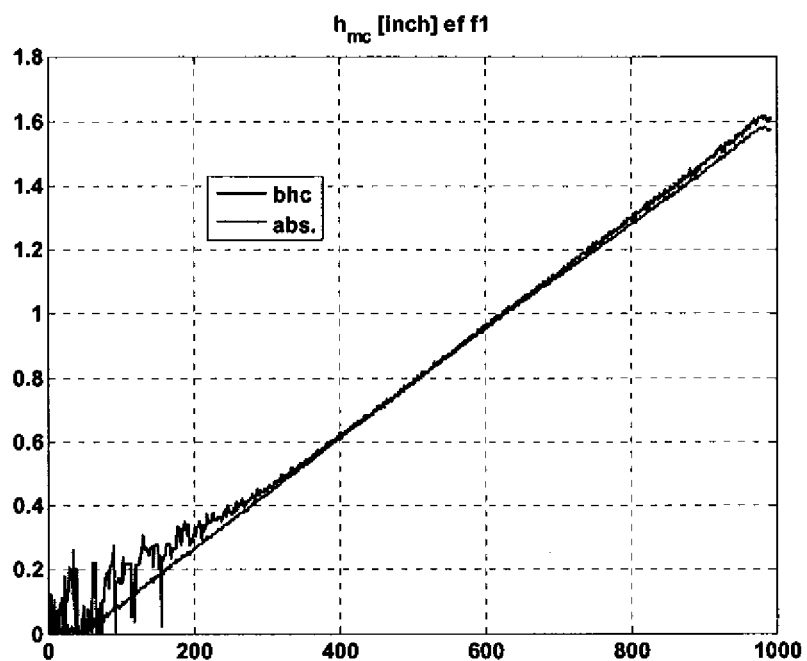
FIG. 22 shows an example of graph representing the improvement of non-differential measurements as compared to a differential measurement.

FIG. 22 shows the improved estimate of the thickness of the mudcake layer. Specifically, the 'bhc' curve (representing standard differential measurements) shows a great deal of noise over the lower portions of the graph relative to the 'abs' curve (representing the non-differential measurement). This reduced noise results in the advantage of increased radial definition for the thin region in the formation closest to the pad.

A further advantage of the single-spacing measurement is to maintain high sensitivity in an anisotropic formation, which is lost at high frequency using differential measurement. An anisotropic formation having different horizontal and vertical characteristics in the formation, wherein because of the subtraction and averaging operations performed by the differential measurements, sensitivity is lost for these types of formations. However, since the single-spacing (or non-differential) measurement does not perform such operations and instead relies on an absolute direct measurement, sensitivity is retained.

Moreover, since the logging tool is capable of using longitudinal and transverse polarization, a further advantage is the increased sensitivity obtained for measurement of an anisotropic formation that is not homogenous in all orientations.

While the EM and petrophysical models can be used to model the radial definition of the formation, according to a further embodiment improved processing by the logging tool can be achieved by selecting the most appropriate model for the logging tool itself. Specifically, it is desirable to select a model that is most suitable for inversion purposes. Inversion is the name given to the processing concerned with the extraction of the relevant formation properties from the measured attenuation and phase parameters of the propagated EM waves. Such formation properties can be expressed as either shown in equations 1, 2 or 4; b (the forward model, EM model or petrophysical model respectively).

Figure 23:
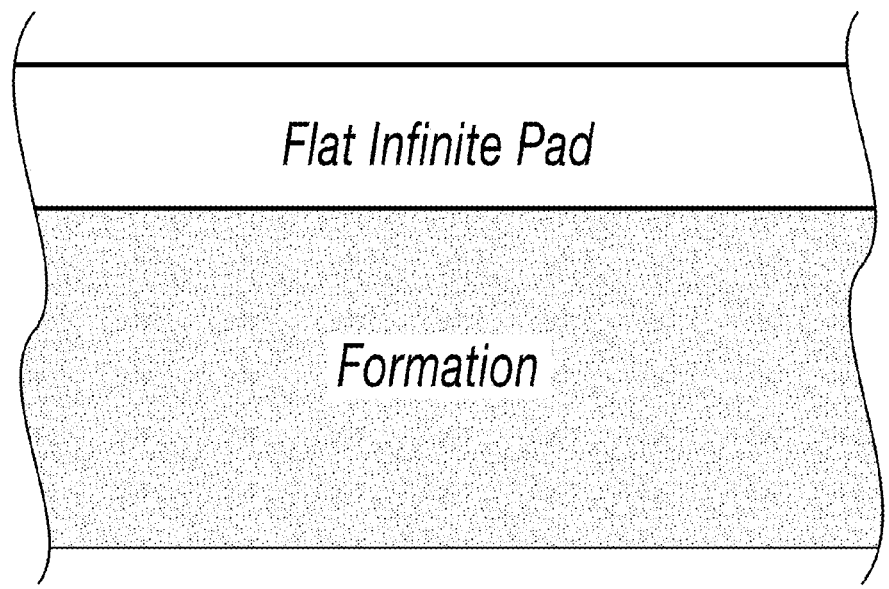
FIG. 23 shows a plane model representation.

In order to perform this inversion from the measure responses, it is necessary to apply a model of the logic tool itself. A first option involves using a so-called 'plane' model in which the pad of the logging tool is modeled as a flat infinite plane aligned alongside the borehole wall as shown in FIG. 23. The advantage of the plane model is that because it makes such a rough approximation, the processing is very fast to compute and hence is particularly suitable for inversion purposes. However, it is not an accurate model for the pad.

Figure 24:
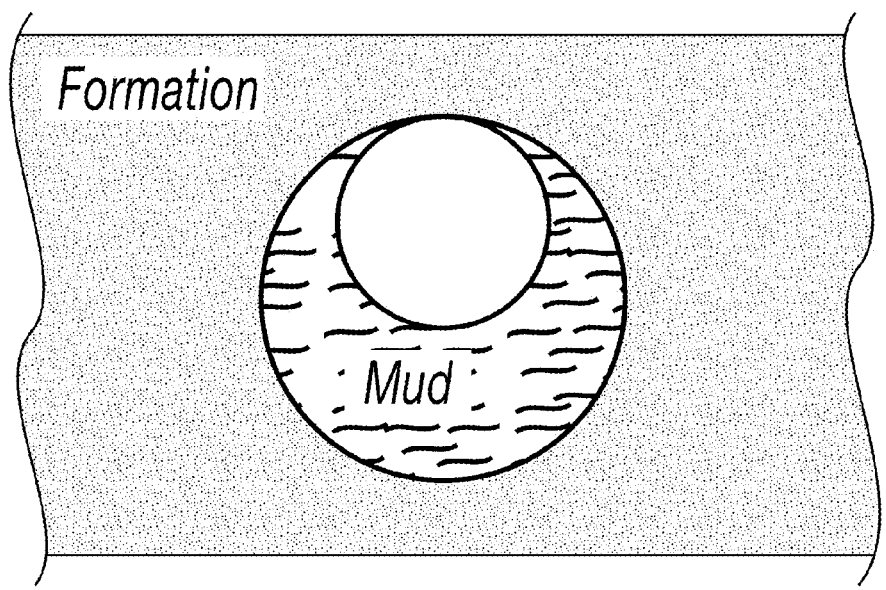
FIG. 24 shows a cylindrical pad model representation.

In contrast, it is possible to model the logging tool as a cylindrical pad as shown in FIG. 24. This cylindrical model more accurately reproduces the characteristics of the pad, but the inversion processing involved with this cylindrical model is several orders of magnitude more time consuming than for the plane model.

To illustrate the difference of computing time required by this model with respect to the plane model, the magnetic field expressions are now compared.

For the plane model, consider a form expression for the plane model homogeneous formation, in longitudinal polarization, for a transmitter-receiver distance d and a formation propagation constant k:

$$H_{zz}^{PLANE}(d,k) = -i\frac{M_0}{4\pi}\int_{-\infty}^{\infty} dk_\rho k_\rho \left[\left(H_0^{(1)}(k_\rho d) - \frac{H_1^{(1)}(k_\rho d)}{k_\rho d}\right) + \frac{k^2}{k_z^2}\frac{H_1^{(1)}(k_\rho d)}{k_\rho d}\right].$$

In the above expression, $k_z = \sqrt{k^2 - k_\rho^2}$ and $H_n^{(1)}$ are the Hankel function of the first kind, of order n. For a given frequency and transmitter-receiver spacing d, it is possible to define a fixed integration path in the complex $k_\rho$ plane and pre-compute the Hankel functions. For each subsequent call to the function, the integration only consists in summing these pre-computed Hankel functions with different coefficients that are simple functions of the formation properties and $k_\rho$. In case of radial layering, the coefficients remain simple functions of layers properties and $k_\rho$.

For the cylindrical pad model, the field expression is reproduced below with the same notation as above, with additional $L_{mud}$ for the mud propagation constant, and e the eccentricity between borehole and tool centers:

$$H_{zz}^{PAD}(d,k) = i\frac{M_0}{8\pi}\sum_{n=0}^{+\infty} 2\chi_n \int_{-\infty}^{+\infty} dk_z e^{ik_z d} \frac{2i}{\pi a k_{mud,\rho}} \frac{a_{22n}^z + k_{mud,\rho}^2 H_n^{(1)}(k_{mud,\rho}a)}{H_n^{(1)'}(k_{mud,\rho}a)}$$

where $\chi_n$ is the Neumann factor that is equal to ½ when n=0 and 1 for other n values; a is pad radius and $\alpha_{22n}^z$ are bottom/right elements of the matrix solutions $\bar{a}_n^z$ of the infinite dimension matrix system:

$$\left(\sum_{n=-\infty}^{+\infty} \zeta_{m-n}(\bar{I}_2 - \bar{R}_m^{mud,form}\bar{R}_n^{mud,pad})\bar{a}_n^z = \bar{R}_m^{mud,form}\sum_{n=-\infty}^{+\infty}\zeta_{m-n}\bar{s}_n^z\right)_{m\in]-\infty;+\infty[}$$

where $\zeta_{m-n} = J_{m-n}(k_{mud,\rho}e)$ are eccentering factors with Bessel functions; $\bar{R}_m^{mud,form}$ are the cylindrical reflection coefficient matrix at borehole/formation interface that mix TE and TM waves; $\bar{R}_n^{mud,pad}$ are the cylindrical reflection coefficient matrix at borehole/pad interface; $\bar{s}_n^z$ are source strength matrices that depend on the source definition.

The main reasons why the cylindrical model requires more time consuming processing are:
1. Explicit dependency of formation or borehole variables in the different Hankel functions; hence no pre-computation of the latter is possible.
2. For each $k_z$ on the integration path, an infinite dimension system, with unknown matrix coefficients that are complex function of borehole and formation properties is necessary. The system is not always well-conditioned; especially when the eccentricity is large and the mode are mixing on interfaces.

Figure 25:
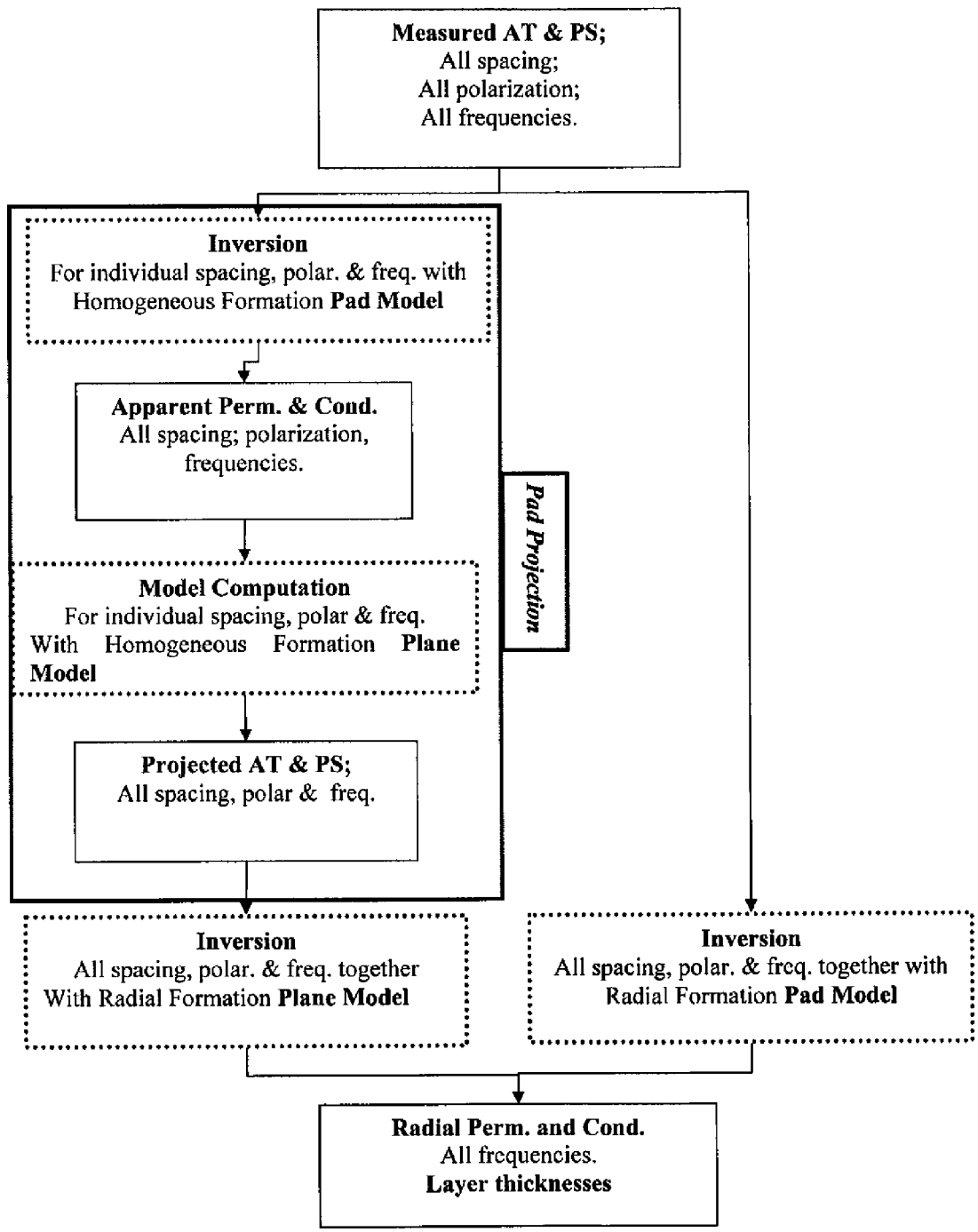
FIG. 25 shows a flowchart representing processing steps of a pad projection model according to an embodiment.

The flowchart shows in FIG. 25 describes an embodiment for implementing a pad projection model, which advantageously offers the speed benefits of the plane model and the accuracy of the pad model. The pad projection model comprises the steps shown within the rectangle 260.

Specifically, at step 250 the attenuation and phase shift are determined based on combining a plurality of measurement responses at different spacings, polarizations and frequencies. Step 252 is the first step of the pad projection model in which a basic inversion is made using a pad model, but the complex processing is overcome of the pad model is overcoming by rather using a table (for example a look-up table) with pre-determined and finite formation parameters. For example, five parameters are stored in the table, i.e. permittivity and conductivity of formation, permittivity and conductivity of mud, borehole size. These parameters can be measured by calibration in the laboratory.

At step 254, the assumption is made that the apparent permittivity and conductivity of the plane model is substantially similar to the apparent permittivity and conductivity of the pad model for a homogenous formation and pad plane. This implies that when taking the apparent permittivity and conductivity computed from the real pad using a homogeneous model for the formation outside the borehole at step S254, then if a forward homogeneous plane model is used at step S256, it is possible to obtain the projected attenuation and phase shift parameters at step S258. These projected parameters can then be extracted using a plane model radial inversion at step S262 to obtain the extracted radial permittivity and conductivity features of the formation.

The alternative branch of the flow chart with block 264 shows the more computationally intensive pad model being used for inversion.

Figure 26:
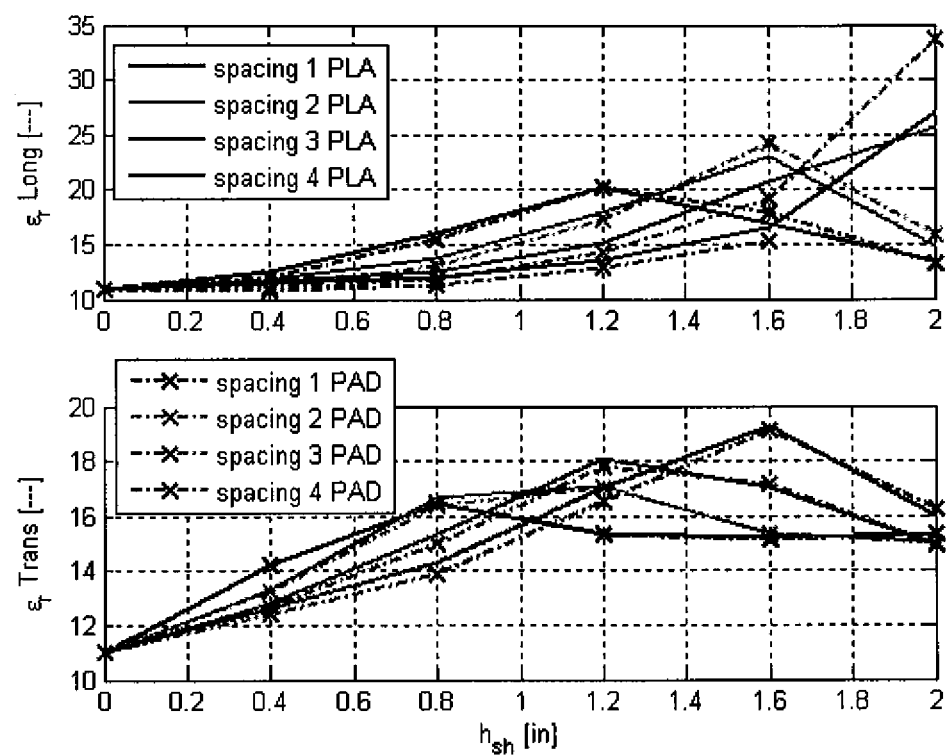
FIG. 26 shows an example of an apparent permittivity comparison between plane and pad models.
Figure 27:
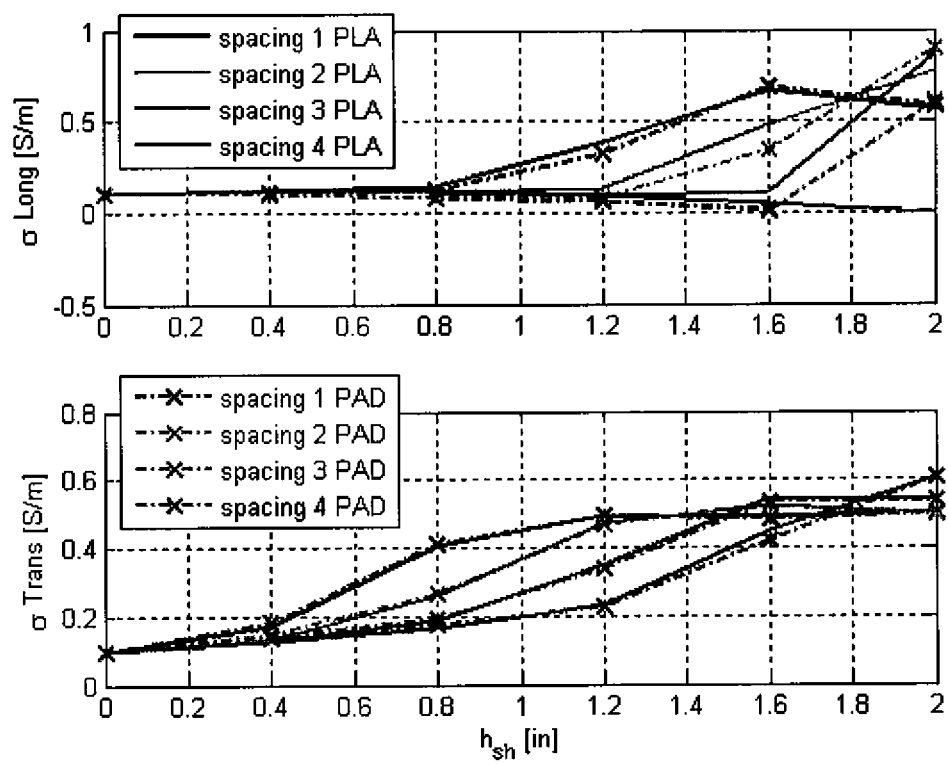
FIG. 27 shows an example of an apparent conductivity comparison between plane and pad models.

The error on the result from the pad projection method is linked directly to the error on the similarity assumption and can be estimated a priori. FIGS. 26 and 27 are examples of apparent permittivity and conductivity "similarity" between the plane model and the pad model.

Specifically, FIG. 26 shows an example of an apparent permittivity comparison between plane and pad models at: 1 GHz; deep zone permittivity is 11 conductivity 0.1 S/m; shallow zone permittivity is 15, conductivity is 0.5 S/m; mud permittivity is 60, conductivity 3.5 S/m; bit size is 8.5 in. plain line is plane model, dashed line is pad model. FIG. 27 shows an example of an apparent conductivity comparison between plane and pad models at: 1 GHz deep zone permittivity is 11 conductivity 0.1 S/m; shallow zone permittivity is 15, conductivity is 0.5 S/m; mud permittivity is 60, conductivity 3.5 S/m; bit size is 8.5 in.

Therefore, the projected pad model embodiment is advantageous in not only providing an improved accuracy of the radial profile at faster processing times, but also in providing the geologist (or user) with a reliable indication of the accuracy of said output results.

For accurate formation evaluation a geologist additionally would like to know where there are so-called fractures in the rock formation, since these fractures typically contain the hydrocarbons sought. Standard logging tools are sufficient to pick the fracture, but it would be desirable to have a logging tool which is able to better characterize (or measure) the dimensions (i.e. thickness) of such fractures in order to decide in which direction to drill.

Two different embodiments are described for determining the fracture dimensions, one of which is best suited detecting larger fracture dimensions and the other better suited for smaller fracture dimensions.

When the fracture size is larger than a threshold value, for example 0.4 inches, the logging tool in a one embodiment is arranged to make use of the previously described idea of single-spacing or absolute response measurement between a single transmitter and receiver. It should be appreciated that when the logging tool is passed over a particular formation, a flat response will be measured when a fracture in the formation is located between a transmitter and receiver that are coupled to form a single-spaced pair. Thus, a flat response not only indicates that a fracture is present, but from a single-spaced response it is possible to estimate the location, dimensions and content of the fracture.

Specifically, the thickness of the fracture can be estimated by knowledge of the geometrical spacing between the transmitter-receiver pair (i.e. the array geometry) and the tool vertical resolution, for example d1 as defined with respect to FIG. 3.

Thus, according to one embodiment it is possible to detect the fracture, estimate the fracture thickness as a function of the tool vertical resolution and on the array geometry itself, and to estimate the properties of the "substance" (or materials) contained in the fracture itself, which is a function of the array geometry and of the properties of the measured EM signal when a thin fracture is crossed.

Figure 28:
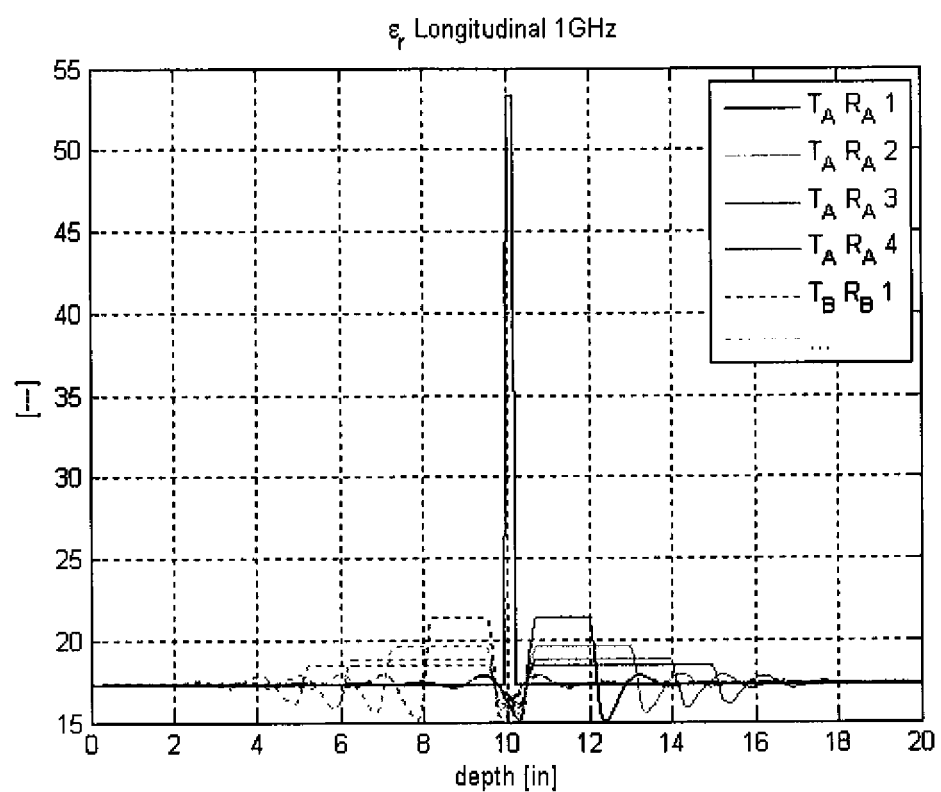
FIG. 28 shows a fracture detected centrally between the flat responses associated with a plurality of single-spaced transmitter-receiver pairs at a plurality of frequencies.
Figure 29:
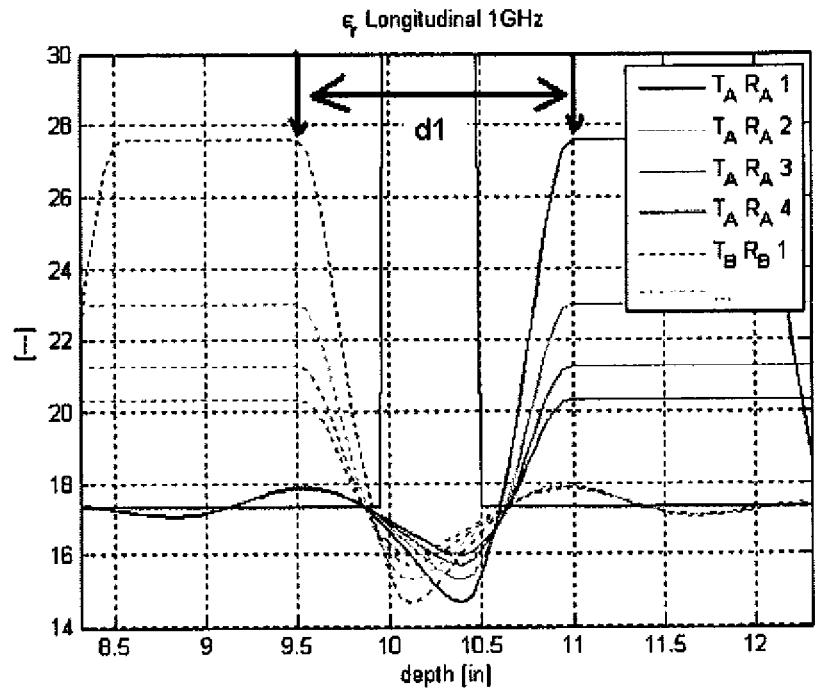
FIG. 29 shows an example of a graph according to an embodiment for determining the fracture thickness.
Figure 30:
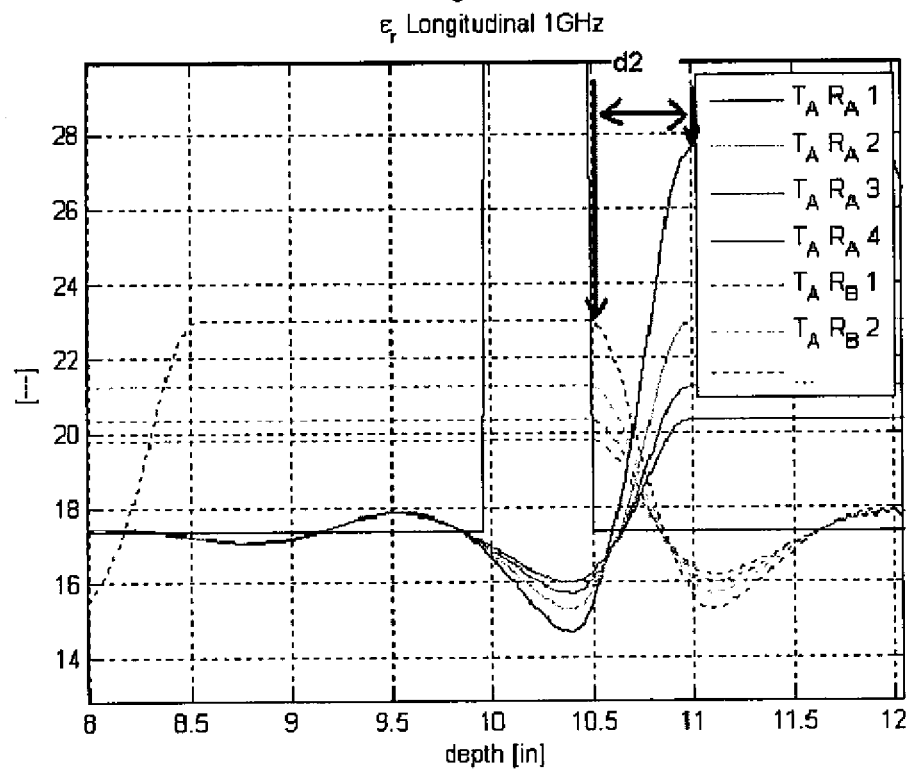
FIG. 30 shows an example of a graph according to a further embodiment for determining the fracture thickness.

FIG. 28 shows a fracture being detected (black solid) line in the centre between the flat responses associated with a plurality of single-spaced transmitter-receiver pairs at a plurality of frequencies. FIG. 29 shows a further embodiment in which the fracture thickness can be determined with a symmetrical transmitter-receiver single-spacing arrangement in which D1 is the distance between transmitter plus the fracture thickness. FIG. 30 shows yet a further embodiment of determining the fracture thickness with an asymmetrical transmitter-receiver single-spacing arrangement in which D2 is directly the thickness of the aperture. It is advantageous to perform both of the embodiments in FIGS. 29 and 30 and then to average the results for all spacing, frequencies and polarization to achieve optimal results.

A further embodiment for determining the fracture dimensions is best suited when the fraction thickness δ is small and is approximated using Equation 5:

$$H_{zz}(d,\epsilon_{bkg}^*,\epsilon_{frac}^*,\delta) \approx H_{zz}(d,\epsilon_{bkg}^*) \cdot [1+\delta \cdot (\epsilon_{frac}^* - \epsilon_{bkg}^*) \cdot \hat{H}_{zz}(d,\epsilon_{bkg}^*)]$$

which in terms of permittivity and conductivity is:

$$\epsilon_{zz}^{*means} \approx \epsilon_{zz}^{*bkg} + \delta \cdot (\epsilon_{frac}^* - \epsilon_{bkg}^*) \cdot \hat{\epsilon}_{zz}^{*bkg} \qquad \text{Equation 6}$$

Figure 31:
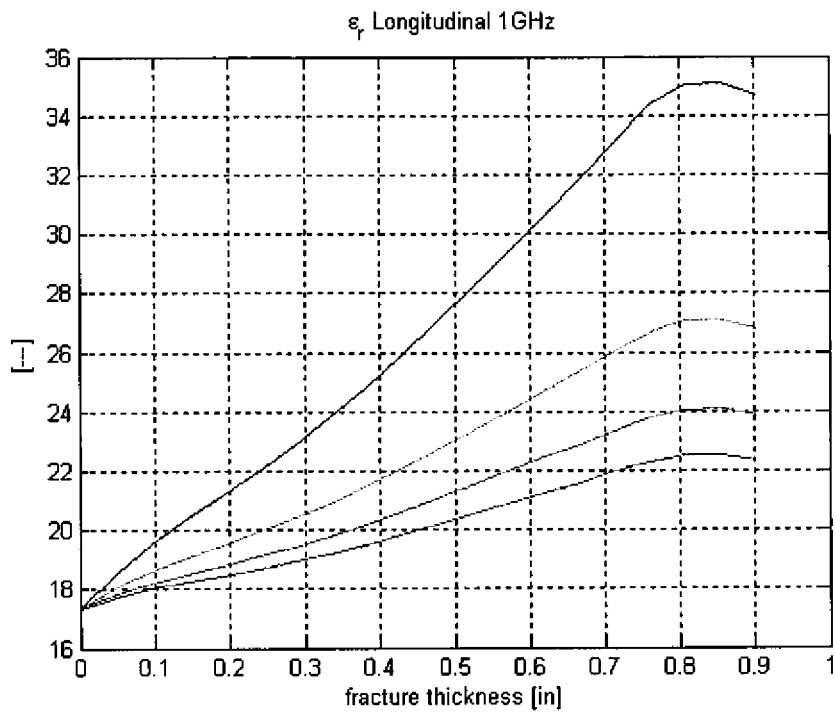
FIG. 31 shows a first example of a linear dependency on the fracture thickness.
Figure 32:
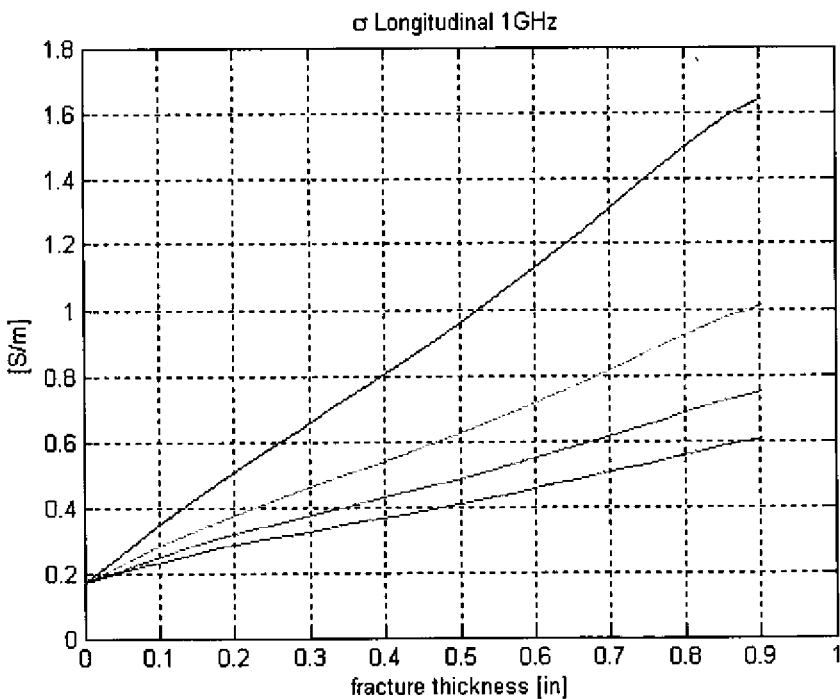
FIG. 32 shows a further example of a linear dependency on the fracture thickness.
Figure 33:
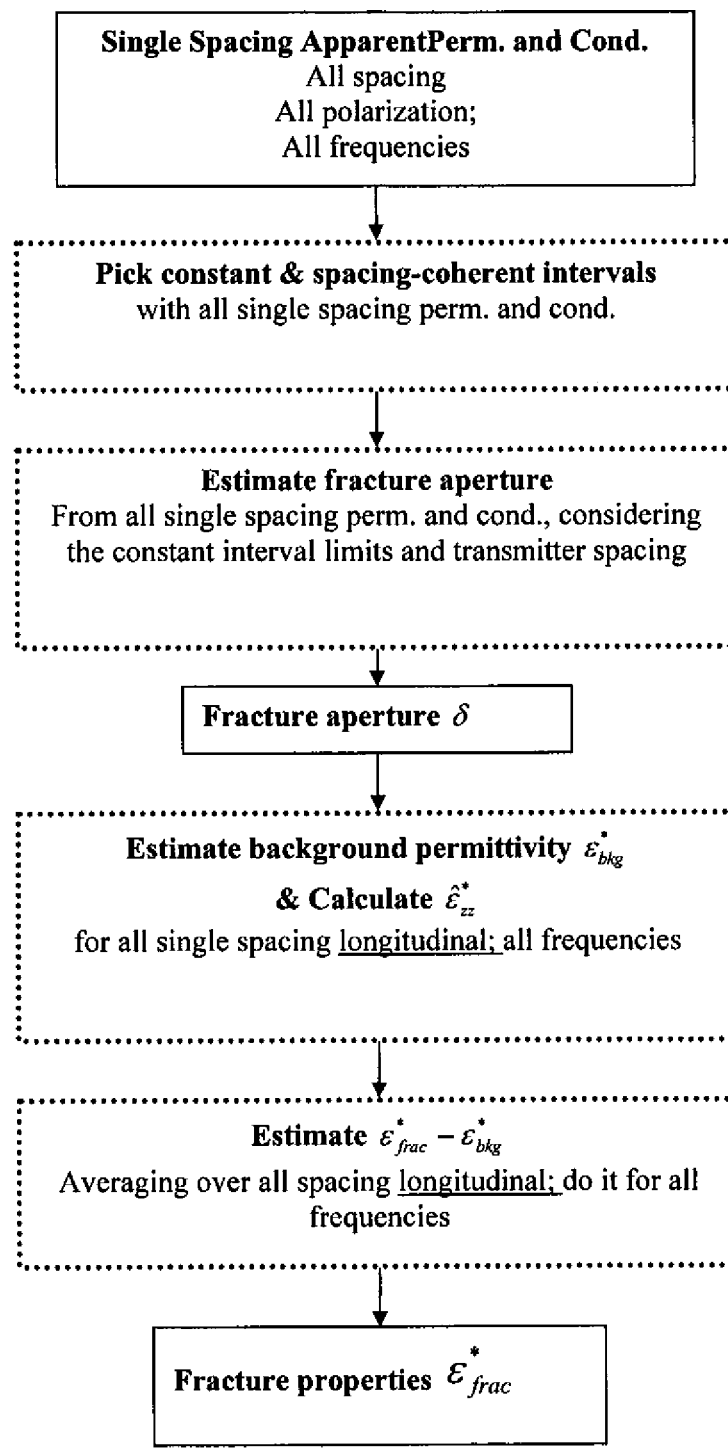
FIG. 33 shows a flowchart of the processing steps for determining the thickness of a small fracture according to one embodiment.

Hence for the apparent permittivity and conductivity, there is determined a linear dependency on the fracture thickness δ as shown for example in FIGS. 31 and 32, wherein the slope is linear up to almost 0.8 inches, i.e. fracture of a small thickness. In these two figures, the background is the same, but the fracture properties are different.

For those two examples, it is possible to back-compute $\hat{\epsilon}_{zz}^{bkg}$ when the slope is linear and to check that these values obtained are the same.

The flow chart shown in FIG. 23 describes the processing steps for determining the thickness of a small fracture δ providing the sampling rate is small enough. Moreover, by using all possible spacing of the ADT tool, the error is reduced.

In a second step, if there is available a reliable estimate of the background medium it is possible to estimate the actual fracture properties. The background medium is defined by the parameter $\epsilon_{bkg}^*$ and is the medium that surrounds the fracture. In FIG. 29, the real part of the background permittivity would be 17.3. The fracture properties comprise the real and imaginary parts of $\epsilon_{frac}^*$. By taking an accurate estimate of $\epsilon_{bkg}^*$, it is possible to compute the slope $\hat{\epsilon}_{zz}^{*bkg}$. Then if δ has been obtained, it can be used in Equation 6 to determine $\epsilon_{frac}^*$.

The transverse polarization shows the same behavior, but the residual function $\hat{H}_\perp$ does also depend on the fracture properties. Thus transverse polarization can still be used to constrain δ. That is, contrary to the zz case, $\hat{\epsilon}_{zz}^{*bkg}$ also depends on $\epsilon_{frac}^*$, so the slope cannot be evaluated from $\epsilon_{bkg}^*$ alone. $\epsilon_{frac}^*$ cannot be estimated from Equation 6 using the transverse polarization. However, the geometrical behavior is the same as for zz, hence the possible contribution to estimate δ.

Figure 34:
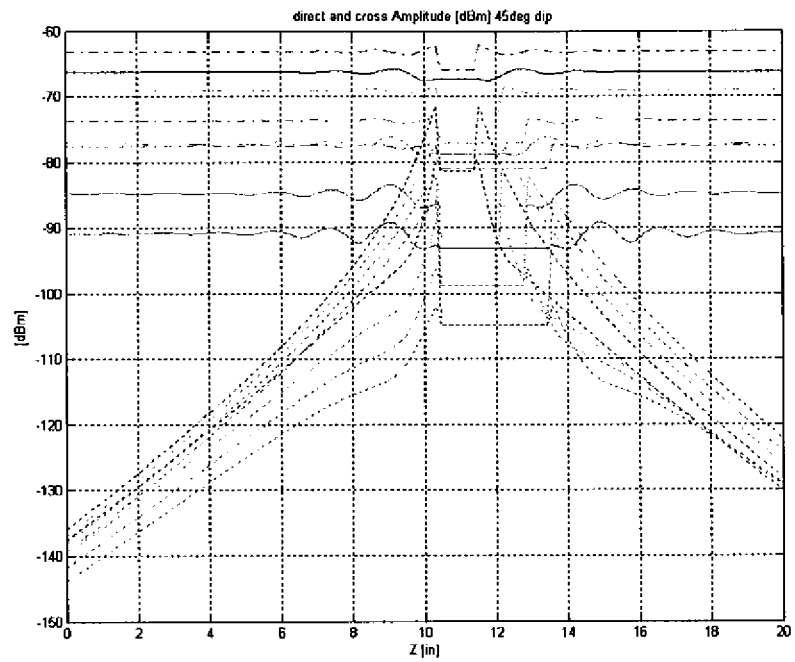
FIG. 34 shows an example of graph according to an embodiment for detecting dip characteristics.
Figure 35:
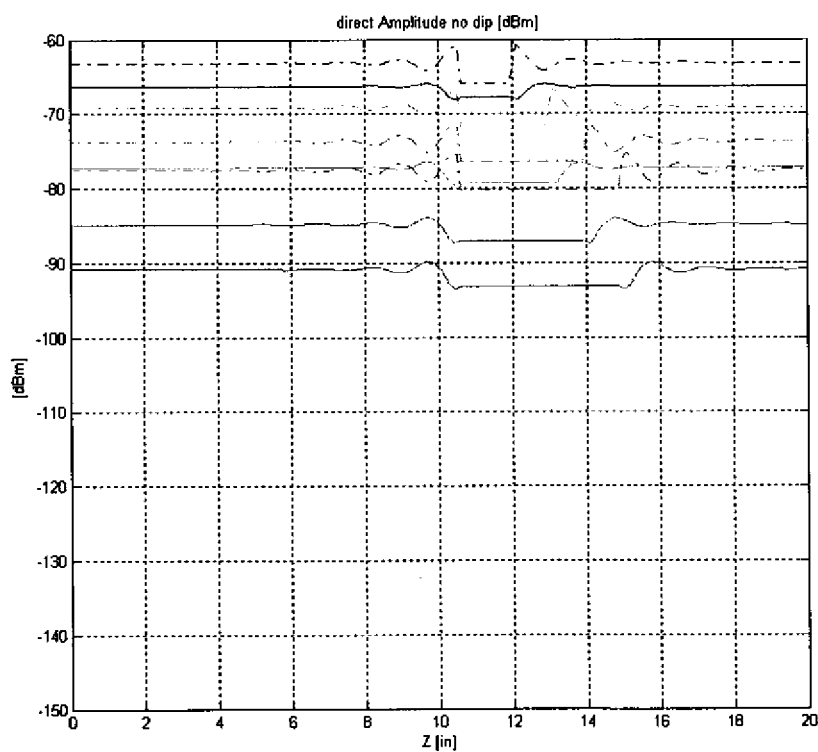
FIG. 35 shows an example of graph where there is no dip.

The same method can be applied for the detection and measurement of dip when present. Dip is the left\right inclination of a bed transverse to the pad of the logging tool. In this situation, the constant values are a combination of longitudinal and transverse measurement for a given transmitter polarization. Hence, combining the direct and cross measurements allow for resolving an additional parameter which is the dip of the fracture. FIG. 34 presents an example of raw direct and cross measurements amplitude. A combination of these different amplitudes with dip angle as parameter allows retrieval of the amplitudes as shown in FIG. 35. That is, FIG. 34 shows direct (longitudinal in plain and transverse in dashed-dot) and cross (dashed) TA-RA[1-4] amplitude measurements in which due to the reciprocity principle, crosses have the same values when the fracture is in-between the transmitter and receiver. Dip is 45 deg. FIG. 35 shown direct (longitudinal in plain and transverse in dashed-dot) transmitter-receiver measurements for amplitude without dip.

Figure 36:
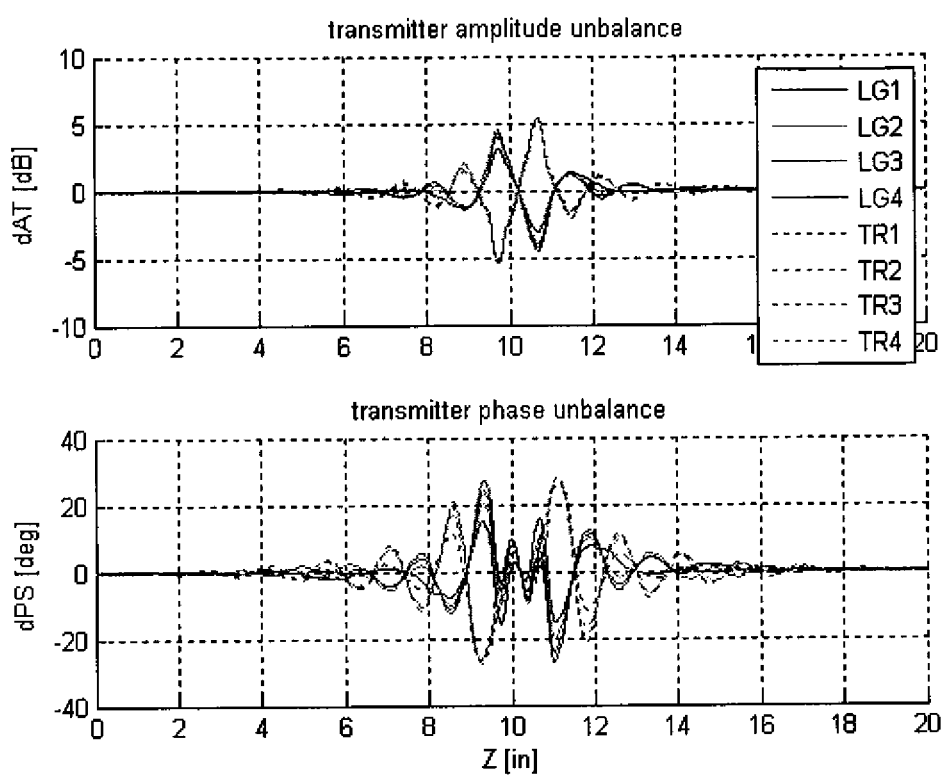
FIG. 36 shows an example of graphs reflecting imbalance patterns in the presence of a fracture.

Yet a further method for detecting a fracture is by monitoring a transmitter imbalance and comparing the two longitudinal and transverse polarizations. That is, a fracture will induce a symmetrical, but opposite phase, imbalance for the two polarizations, wherein all imbalances happen to cross the zero line at the middle of the fracture. FIG. 36 shows graphs reflecting imbalance pattern in the presence of a fracture.

According to yet a further embodiment it is desirable to detect inclusions (solids) or pebbles (or vugs) that exist in a formation and affect the measurement of the logging tool depending on the polarization. By combing the transverse polarization measurement of FIG. 12 and the longitudinal polarization measurement of FIG. 11, improved detection of such inclusions is possible since a broader range of scanning is possible. That is, each of FIGS. 11 and 12 show a plurality of different EM waves irradiating the formation, and wherein the longitudinal polarization which is more sensitive to inclusions near the borehole wall contrasts with transverse polarization front formation to form geological patterns. These patterns are observed and gather in pattern lists for further qualitative recognition. Inversion is also possible provided that the observed pattern can be modeled.

Figure 37:
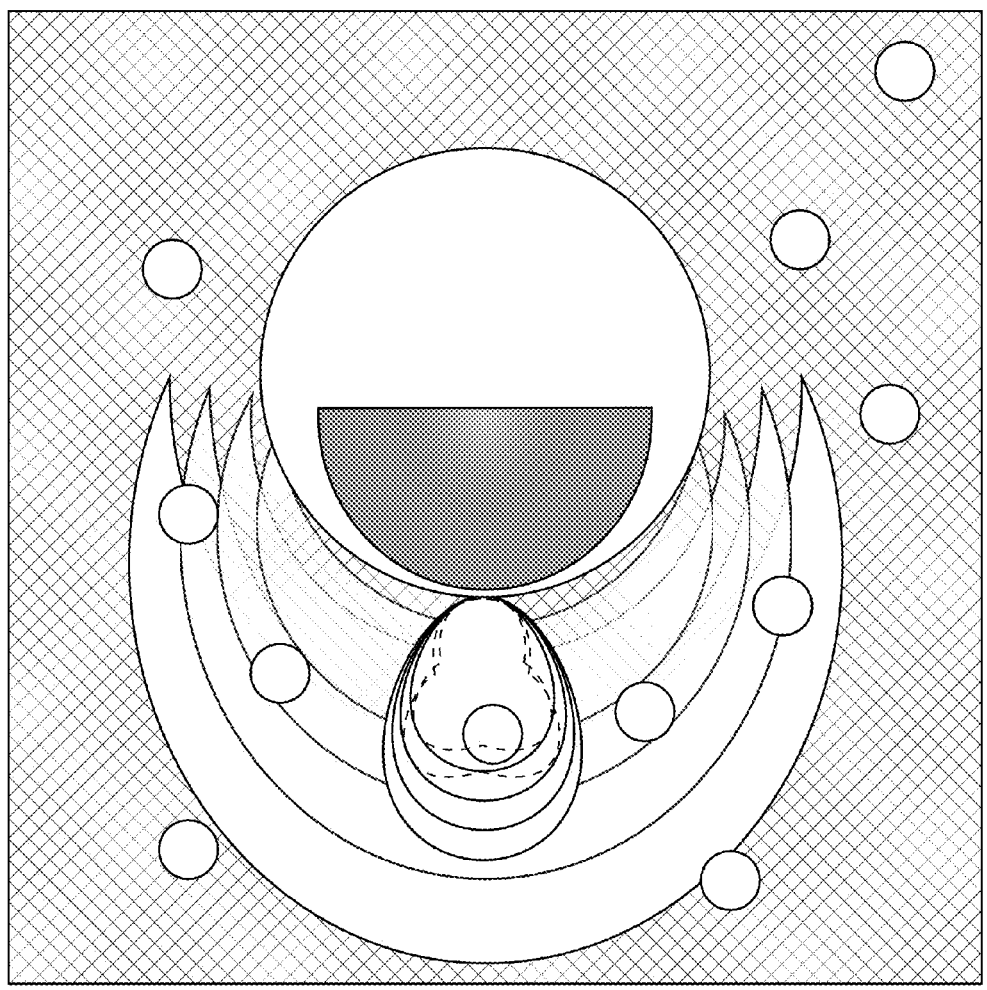
FIG. 37 shows inclusions detected by combining the longitudinal and transverse polarizations according to one embodiment.

Specifically, FIG. 37 shows how inclusions are detected by combining the longitudinal and transverse polarizations, wherein the longitudinal polarazitions scans a wider cross-sectional horizontal volume of the formation compared to the transverse and wherein the longitudinal spacings are more distinct from one another than the transverse spacings. That is, it can be seen that the EM radiation pattern has different propagation waves that cover a large volume with respect to each other, than as opposed to the comparatively smaller volumes covered by respective EM radiation waves radiating from transverse polarization.

Figure 38:
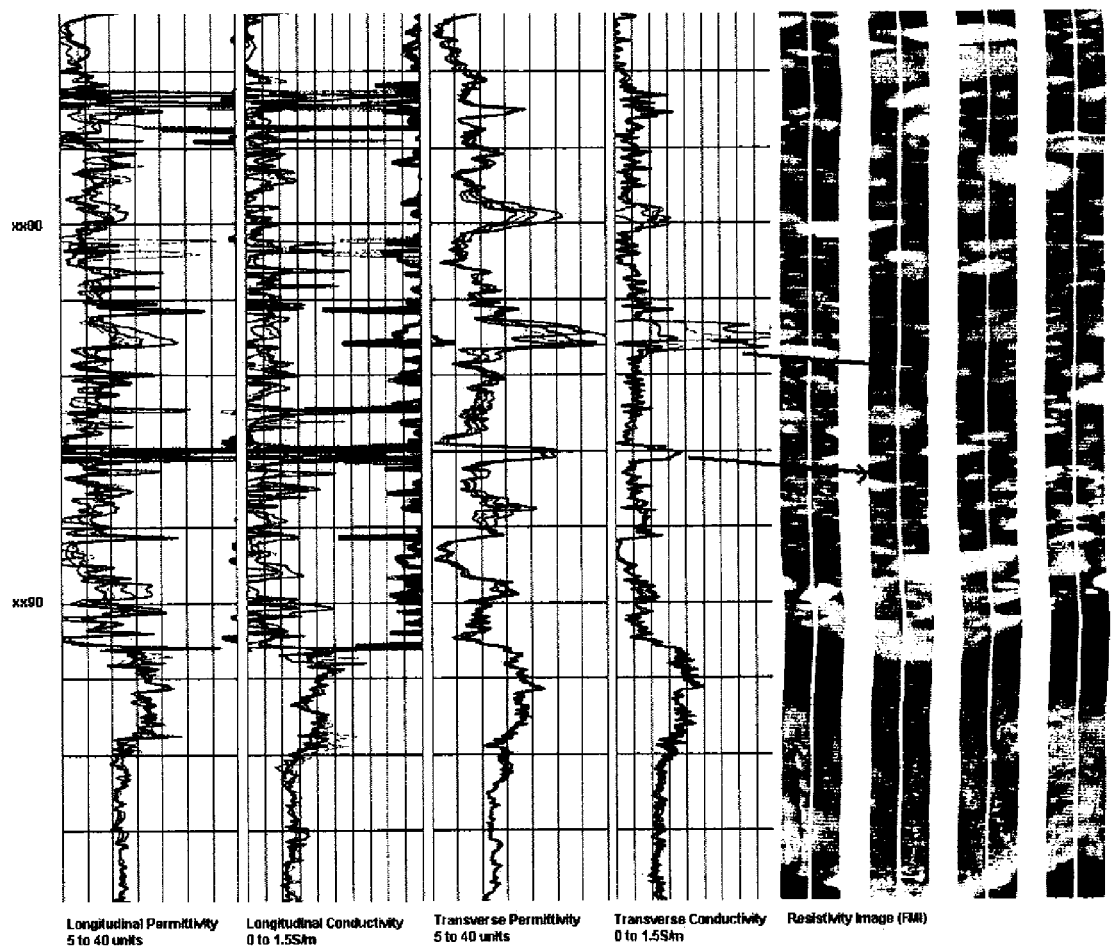
FIG. 38 shows an example of a log display detecting non-conductive inclusions in a conglomerate formation.

FIG. 38 shows a log with a display that enables the detection of non-conductive inclusions in a conglomerate formation detection. As can be seen from the log, the extraction of the rock feature becomes understandable. Comparing the derivatives between different spacings or setting a threshold and a counter are some examples of automating the process.

Figure 39:
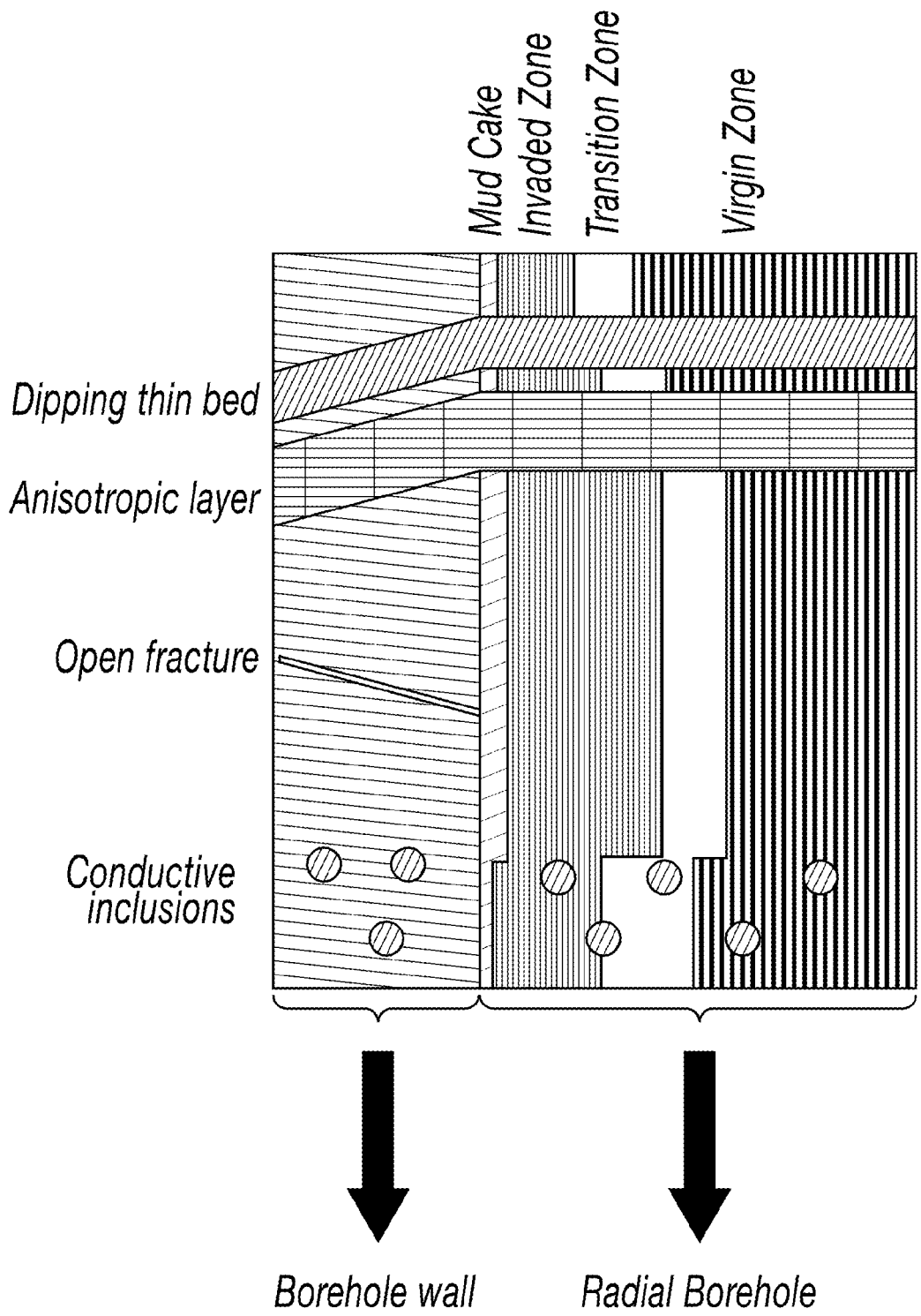
FIG. 39 shows a graphical representation of various embodiments being combined for determining an improved radial profile.

Finally, FIG. 39 shows a display reflecting all the improvements made in a logging tool. Furthermore since the pad of the logging tool has an orientation device, the features can be placed in space. Specifically the logging tool is able to: provide improved detection of conductive and non-conductive inclusions in the borehole wall layers and the deeper radial layers of the borehole, detect fractures in the borehole wall, detect dipping and formation parameters in isotropic and anisotropic layers of the various layers of the formation.

The invention claimed is:

1. An apparatus for determining a property of a downhole formation, the apparatus comprising:
    an array having a plurality of transmitters and receivers capable of propagating electromagnetic waves through the formation;
    measuring circuitry for measuring an effect of the formation on the propagating waves;
    control circuitry arranged to vary the propagating waves as a function of frequency, spacing and polarization; and
    processing circuitry arranged to combine the effects of the propagating waves that are varied according to frequency, spacing and polarization for determining the property of the downhole formation.

2. The apparatus of claim 1, wherein the simultaneous combination of the measured effects of varied frequency, spacing and polarization enable a plurality of different volumes of the formation to be scanned simultaneously.

3. The apparatus of claim 1, wherein the effects of a plurality of varied frequencies, spacing and polarization are combined simultaneously.

4. The apparatus of claim 1, wherein the control circuitry having a frequency generator for varying the propagating waves.

5. The apparatus of claim 1, wherein the spacing is varied by at least one of selecting transmitters and receivers in the array that are spaced at varied distances relative to each other.

6. The apparatus of claim 1, wherein the array is capable of varying the polarization to be at least one of transversal and longitudinal polarization by feeding a current through at least two collocated conductors in an antenna cavity of the relevant transmitter of the array.

7. A method for determining different volumes of a formation simultaneously, the method comprising:
    propagating electromagnetic waves through the formation with an array having a plurality of transmitters and receivers;
    measuring an effect of the propagating waves on the formation;
    controlling the propagating waves to vary as a function of frequency, spacing and polarization, each of varied propagating waves having a different effect on the formation; and
    combining the measured effects of the varied propagating waves for determining different volumes of the formation simultaneously.

8. The method of claim 7, wherein at least some of the different volumes of the formation overlap such that it is possible to combine said overlapping volumes for determining a more accurate estimation of a property of the formation in the overlapping volumes.

9. The method of claim 7, where the different volumes of the formation are different depths of investigation into the formation.

* * * * *